United States Patent
Frolov

(10) Patent No.: US 8,224,189 B1
(45) Date of Patent: Jul. 17, 2012

(54) RETRO-DIRECTIVE TARGET FOR FREE-SPACE OPTICAL COMMUNICATION AND METHOD OF PRODUCING THE SAME

(75) Inventor: Sergey Frolov, Murray Hill, NJ (US)

(73) Assignee: Sunlight Photonics Inc., South Plainfield, NJ (US)

( * ) Notice: Subject to any disclaimer, the term of this patent is extended or adjusted under 35 U.S.C. 154(b) by 1396 days.

(21) Appl. No.: 11/670,908

(22) Filed: Feb. 2, 2007

(51) Int. Cl.
*H04B 10/00* (2006.01)
*H04B 10/06* (2006.01)

(52) U.S. Cl. .................. 398/170; 359/529; 359/530

(58) Field of Classification Search .......... 398/169, 398/170; 359/515, 529–533
See application file for complete search history.

(56) References Cited

U.S. PATENT DOCUMENTS

| | | |
|---|---|---|
| 2,310,790 A | 2/1943 | Jungersen |
| 3,417,398 A | 12/1968 | Lewis et al. |
| 3,443,098 A | 5/1969 | Lewis |
| 3,645,601 A * | 2/1972 | Doctoroff et al. ............. 359/360 |
| 3,922,065 A | 11/1975 | Schultz |
| 3,924,929 A | 12/1975 | Holmen et al. |
| 3,949,397 A | 4/1976 | Wagner et al. |
| 3,989,942 A | 11/1976 | Waddoups |
| 4,020,489 A | 4/1977 | Bishop |
| 4,049,969 A | 9/1977 | Salonimer et al. |
| 4,050,819 A | 9/1977 | Lichtman |
| 4,064,434 A | 12/1977 | Waksberg |
| 4,073,568 A | 2/1978 | Heasley |
| 4,075,631 A | 2/1978 | Dumez |
| 4,090,067 A | 5/1978 | Bell, III et al. |
| 4,091,412 A | 5/1978 | Salonimer |
| 4,096,380 A | 6/1978 | Eichweber |
| 4,099,050 A | 7/1978 | Sauermann |
| 4,107,609 A | 8/1978 | Gruenberg |
| 4,131,791 A | 12/1978 | Lego, Jr. |
| 4,134,008 A | 1/1979 | de Corlieu et al. |
| 4,143,263 A | 3/1979 | Eichweber |
| 4,150,824 A | 4/1979 | Villa |
| 4,153,366 A | 5/1979 | Mamon et al. |

(Continued)

FOREIGN PATENT DOCUMENTS

EP 0100275 2/1984

(Continued)

OTHER PUBLICATIONS

International Search Report mailed Jul. 3, 2008 for PCT Application No. PCT/US2008/052425.

(Continued)

*Primary Examiner* — Kenneth N Vanderpuye
*Assistant Examiner* — Daniel Dobson
(74) *Attorney, Agent, or Firm* — Moser Taboada; Alan Taboada

(57) ABSTRACT

An apparatus for retro-reflecting electromagnetic energy and a method for producing the same are provided. The apparatus includes a substrate and a plurality of corner mirrors disposed in said substrate. The plurality of corner mirrors may have respective angles of acceptance with respect to the substrate to be operable to retro-reflect the electromagnetic energy within the respective angles of acceptance. The plurality of corner mirrors are arranged to provide a combined angle of acceptance that is greater than any one of the respective angles of acceptance. The apparatus may also include at least one modulator disposed over at least a portion of said plurality of corner mirrors. The modulator is operable to modulate any of said electromagnetic energy received and retro-reflected.

27 Claims, 17 Drawing Sheets

U.S. PATENT DOCUMENTS

| | | | |
|---|---|---|---|
| 4,160,903 A | 7/1979 | McKechnie et al. | |
| 4,174,524 A | 11/1979 | Moran | |
| 4,198,632 A | 4/1980 | Bishop | |
| 4,203,667 A | 5/1980 | Pierce et al. | |
| 4,218,138 A | 8/1980 | Robertsson | |
| 4,234,141 A | 11/1980 | Miller, Jr. et al. | |
| 4,249,265 A | 2/1981 | Coester | |
| 4,325,146 A | 4/1982 | Lennington | |
| 4,332,437 A | 6/1982 | Searight et al. | |
| 4,361,911 A | 11/1982 | Buser et al. | |
| 4,364,631 A | 12/1982 | Arondel et al. | |
| 4,436,376 A | 3/1984 | Fergason | |
| 4,442,430 A | 4/1984 | Schneider | |
| 4,464,014 A | 8/1984 | Sick et al. | |
| 4,504,232 A | 3/1985 | Bond et al. | |
| 4,517,569 A | 5/1985 | Gerharz | |
| 4,570,062 A | 2/1986 | Tsumura et al. | |
| 4,589,740 A | 5/1986 | Durremberger | |
| 4,662,003 A | 4/1987 | Eichweber | |
| 4,709,580 A | 12/1987 | Butts, Jr. et al. | |
| 4,727,593 A | 2/1988 | Goldstein | |
| 4,731,879 A | 3/1988 | Sepp et al. | |
| 4,763,361 A | 8/1988 | Honeycutt et al. | |
| 4,777,660 A | 10/1988 | Gould et al. | |
| 4,784,448 A | 11/1988 | Sepp et al. | |
| 4,814,769 A | 3/1989 | Robin et al. | |
| 4,834,531 A | 5/1989 | Ward | |
| 4,836,672 A | 6/1989 | Naiman et al. | |
| 4,837,575 A | 6/1989 | Conner, Jr. | |
| 4,866,781 A | 9/1989 | Borken et al. | |
| 4,887,310 A | 12/1989 | Meyzonnette et al. | |
| 4,889,409 A | 12/1989 | Atcheson | |
| 4,897,622 A | 1/1990 | Cheo et al. | |
| 4,906,092 A | 3/1990 | O'Meara | |
| 4,973,136 A | 11/1990 | Braatz | |
| 4,983,021 A | 1/1991 | Fergason | |
| 5,001,488 A | 3/1991 | Joguet | |
| 5,059,746 A * | 10/1991 | Hayes et al. | 174/524 |
| 5,117,301 A | 5/1992 | Tsumura | |
| 5,121,242 A * | 6/1992 | Kennedy | 398/170 |
| 5,142,288 A | 8/1992 | Cleveland | |
| 5,170,168 A | 12/1992 | Roth | |
| 5,204,536 A | 4/1993 | Vardi | |
| 5,253,099 A | 10/1993 | Heidemann | |
| 5,274,379 A | 12/1993 | Carbonneau et al. | |
| 5,280,167 A | 1/1994 | Dubois | |
| 5,299,227 A | 3/1994 | Rose | |
| 5,300,783 A | 4/1994 | Spencer et al. | |
| 5,303,020 A | 4/1994 | Croteau | |
| 5,303,256 A | 4/1994 | Sumida | |
| 5,315,491 A | 5/1994 | Spencer et al. | |
| 5,355,241 A | 10/1994 | Kelley | |
| 5,375,008 A | 12/1994 | Guerreri | |
| 5,389,196 A | 2/1995 | Bloomstein et al. | |
| 5,396,243 A | 3/1995 | Jalink, Jr. et al. | |
| 5,424,737 A | 6/1995 | Lindell | |
| 5,465,171 A | 11/1995 | Weber et al. | |
| 5,491,580 A | 2/1996 | O'Meara | |
| 5,580,156 A | 12/1996 | Suzuki et al. | |
| 5,612,781 A | 3/1997 | Ohtomo et al. | |
| 5,745,575 A | 4/1998 | Otto et al. | |
| 5,751,469 A | 5/1998 | Arney et al. | |
| 5,754,324 A | 5/1998 | Nielsen et al. | |
| 5,793,034 A | 8/1998 | Wesolowicz et al. | |
| 5,819,164 A | 10/1998 | Sun et al. | |
| 5,822,430 A | 10/1998 | Doud | |
| 5,870,215 A | 2/1999 | Milano et al. | |
| 5,872,646 A | 2/1999 | Alderman et al. | |
| 5,936,752 A | 8/1999 | Bishop et al. | |
| 5,960,133 A | 9/1999 | Tomlinson | |
| 6,017,125 A | 1/2000 | Vann | |
| 6,050,691 A * | 4/2000 | Fellows et al. | 359/529 |
| 6,097,330 A | 8/2000 | Kiser | |
| 6,104,517 A | 8/2000 | Blodgett et al. | |
| 6,107,364 A * | 8/2000 | Fong et al. | 522/182 |
| 6,115,168 A | 9/2000 | Zhao et al. | |
| 6,137,623 A | 10/2000 | Roberson et al. | |
| 6,147,806 A | 11/2000 | Park et al. | |
| 6,154,299 A | 11/2000 | Gilbreath et al. | |
| 6,198,528 B1 | 3/2001 | Maynard | |
| 6,233,084 B1 | 5/2001 | Owen et al. | |
| 6,268,948 B1 | 7/2001 | Gelbart | |
| 6,366,388 B1 | 4/2002 | Hampp | |
| 6,381,055 B1 | 4/2002 | Javitt et al. | |
| 6,439,728 B1 | 8/2002 | Copeland | |
| 6,473,220 B1 | 10/2002 | Clikeman et al. | |
| 6,493,123 B1 | 12/2002 | Mansell et al. | |
| 6,510,401 B2 | 1/2003 | Martin et al. | |
| 6,517,923 B1 * | 2/2003 | Nakayama et al. | 428/68 |
| 6,573,953 B1 | 6/2003 | Igasaki et al. | |
| 6,573,959 B1 | 6/2003 | Molsen | |
| 6,590,695 B1 | 7/2003 | Kurtz et al. | |
| 6,603,134 B1 | 8/2003 | Wild et al. | |
| 6,624,916 B1 | 9/2003 | Green et al. | |
| 6,721,539 B1 | 4/2004 | O'Brien et al. | |
| 6,767,102 B1 | 7/2004 | Heenan et al. | |
| 6,768,873 B1 | 7/2004 | Palese | |
| 6,775,480 B1 | 8/2004 | Goodwill | |
| 6,778,779 B1 | 8/2004 | Shay et al. | |
| 6,788,366 B2 * | 9/2004 | Sawayama et al. | 349/113 |
| 6,806,992 B2 | 10/2004 | Soneda et al. | |
| 6,847,669 B2 | 1/2005 | Perner | |
| 6,859,573 B2 | 2/2005 | Bouevitch et al. | |
| 6,934,069 B2 | 8/2005 | Moon et al. | |
| 6,954,302 B2 | 10/2005 | Sayyah et al. | |
| 6,956,687 B2 | 10/2005 | Moon et al. | |
| 6,975,812 B1 | 12/2005 | Kuhara et al. | |
| 6,978,093 B2 | 12/2005 | Clark | |
| 6,979,088 B2 | 12/2005 | Currie | |
| 7,002,646 B2 | 2/2006 | Misewich et al. | |
| 7,095,962 B2 | 8/2006 | Karube | |
| 7,098,976 B2 | 8/2006 | Minoura et al. | |
| 7,452,588 B2 * | 11/2008 | Smith et al. | 428/172 |
| 7,484,857 B2 * | 2/2009 | Bozler et al. | 359/529 |
| 2001/0013967 A1 | 8/2001 | Tsumura | |
| 2002/0191292 A1 | 12/2002 | Mimura | |
| 2003/0035605 A1 | 2/2003 | Bouevitch et al. | |
| 2003/0053015 A1 | 3/2003 | Minoura et al. | |
| 2003/0227681 A1 | 12/2003 | Currie | |
| 2004/0051929 A1 | 3/2004 | Sampsell et al. | |
| 2004/0183964 A1 | 9/2004 | Misewich et al. | |
| 2004/0208602 A1 | 10/2004 | Plante | |
| 2004/0218515 A1 | 11/2004 | Lindgren | |
| 2004/0246411 A1 | 12/2004 | Stephenson et al. | |
| 2005/0018292 A1 * | 1/2005 | Mimura et al. | 359/529 |
| 2005/0088743 A1 | 4/2005 | Sawayama et al. | |
| 2005/0105153 A1 * | 5/2005 | Youngner et al. | 359/198 |
| 2005/0105914 A1 | 5/2005 | Chen | |
| 2005/0158059 A1 | 7/2005 | Vaananen | |
| 2005/0163511 A1 | 7/2005 | Cicchiello | |
| 2005/0231803 A1 * | 10/2005 | Handerek et al. | 359/529 |
| 2005/0240341 A1 * | 10/2005 | Fielhauer et al. | 701/200 |
| 2006/0061864 A1 | 3/2006 | Aronstein et al. | |
| 2006/0114545 A1 | 6/2006 | Bozler et al. | |
| 2007/0242356 A1 * | 10/2007 | Thakkar et al. | 359/530 |
| 2007/0273948 A1 * | 11/2007 | Roes et al. | 359/222 |
| 2008/0000990 A1 * | 1/2008 | Thomas | 235/494 |
| 2008/0273243 A1 * | 11/2008 | Karasikov et al. | 359/532 |

FOREIGN PATENT DOCUMENTS

| | | |
|---|---|---|
| EP | 0249580 | 12/1987 |
| EP | 0255792 | 2/1988 |
| EP | 0650078 | 4/1995 |
| KR | 1019980035761 A | 8/1998 |
| KR | 1019990064562 A | 8/1999 |
| WO | 8302667 | 8/1983 |
| WO | 8706411 | 10/1987 |
| WO | 8707092 | 11/1987 |
| WO | 03071719 A1 | 8/2003 |
| WO | 2005106541 A1 | 11/2005 |

OTHER PUBLICATIONS

International Written Opinion mailed Jul. 3, 2008 for PCT Application No. PCT/US2008/052425.

* cited by examiner

RETRO-DIRECTIVE TARGET FOR FREE-SPACE OPTICAL COMMUNICATION AND METHOD OF PRODUCING THE SAME

BACKGROUND

1. Field

The following relates to retro-directive targets and communications using such retro-directive targets. More particularly, the following relates to retro-directive targets that have wide angles of acceptance and that are useful for carrying out bidirectional free-space optical communications.

2. Related Art

A retro-reflector or other retro-reflective device provides an impetus for carrying out bidirectional free-space optical communications. Such a device makes possible the ability to retro-reflect back to a point of origin a received transmission of electromagnetic energy, such as a light or "laser" beam. When combined with a modulator and demodulator, the combination provides the ability to carry on bidirectional free-space optical communications.

For instance, the demodulator may demodulate information that was modulated onto the laser beam at the point of origin by a source device; the retro-reflective device may retro-reflect the laser beam onto the modulator to form a retro-reflected beam for delivery back to the point of origin, and the modulator may modulate additional or different information onto the a retro-reflected beam as such retro-reflected beam is reflected back to the point of origin. A receiver at the point of origin, in turn, may receive the retro-reflected beam and demodulate the information carried therein. Accordingly, the source and the combination of the demodulator, modulator and retro-reflective device can exchange information.

Given that frequencies used to carry out such optical communications allow for an extremely fast exchange of information, this type of device is conducive to mass exploitation in not only commercial applications, such as high speed voice and data communications, but also in military applications, such as friend-or-foe identification and/or establishing a secure communication channel in battlefield conditions.

Hindering this exploitation, however, are (1) the ability of the retro-reflective device to passively reflect light in the direction of (i.e., retro-reflect back to) the source over a wide acceptance angle; (2) the ability to arbitrarily modulate the reflected light either in phase, amplitude and/or polarization without detrimentally limiting the acceptance angle of the retro-reflective device; (3) the ability to be powered by a low-voltage, small current power pack, such as a battery or fuel cell; (4) the ability to be formed into small form factor; and (5) the ability to be conducive to manufacturing processes, which in turn, leads to potentially low-cost and high-volume manufacturing processes.

SUMMARY

An apparatus for retro-reflecting electromagnetic energy and a method for producing the same are provided. The apparatus includes a substrate and a plurality of corner mirrors disposed in said substrate. The plurality of corner mirrors may have respective angles of acceptance with respect to the substrate so as to be operable to retro-reflect the electromagnetic energy within the respective angles of acceptance. The plurality of corner mirrors are arranged to provide a combined angle of acceptance that is greater than any one of the respective angles of acceptance.

The apparatus may also include at least one modulator disposed over at least a portion of said plurality of corner mirrors. The modulator is operable to modulate any of said electromagnetic energy received and retro-reflected.

BRIEF DESCRIPTION OF THE DRAWINGS

So the manner in which the above recited features of the present invention can be understood in detail, a more particular description of the invention, briefly summarized above, may be had by reference to embodiments, some of which are illustrated in the appended drawings. It is to be noted, however, the appended drawings illustrate only typical embodiments of this invention and are therefore not to be considered limiting of its scope, for the invention may admit to other equally effective embodiments.

DETAILED DESCRIPTION

Overview

In the following detailed description, numerous specific details are set forth in order to provide a thorough understanding of exemplary embodiments or other examples described herein. However, it will be understood that these embodiments and examples may be practiced without the specific details. In other instances, well-known methods, procedures, components and circuits have not been described in detail, so as not to obscure the following description. Further, the embodiments disclosed are for exemplary purposes only and other embodiments may be employed in lieu of, or in combination with, the embodiments disclosed.

As summarized above and described in more detail below, the apparatus for retro-reflecting electromagnetic energy and the method for producing the same is provided. Embodiments of this apparatus and method may facilitate the ability to establish bidirectional free-space optical communications over large distances within a view-of-site ranging from several meters to several kilometers.

For instance, a point-to-point communication link (e.g., asymmetrical or symmetrical) may be established between a source, which includes a high power transmitter for transmitting electromagnetic energy and a receiver for receiving information carried by retro-reflected electromagnetic energy, and the apparatus, which may be operable to append or otherwise incorporate the information ("outgoing information") into the electromagnetic energy received within the combined angle of acceptance and to retro-reflect to the receiver the electromagnetic energy having the outgoing information incorporated thereto.

Embodiments of the apparatus and method provide the ability to exploit en masse not only commercial applications, such as high speed voice and data communications, but also in military applications, such as friend-or-foe identification and/or establishing a secure communication channel in battlefield conditions. As set forth below, the embodiments and examples of the apparatus and method provide the ability to (i) passively reflect light in the direction of (i.e., retro-reflect back to) the source over a wide acceptance angle; and (ii) arbitrarily modulate the reflected light either in phase, amplitude and/or polarization without detrimentally limiting the acceptance angle of the retro-reflective device. In addition, alternative embodiments and examples of the apparatus may be (i) powered by a low-voltage, small current power pack, such as a battery or fuel cell; (ii) formed into small form factor; and (iii) be friendly to manufacturing processes.

Example System Architecture

Figure 1:
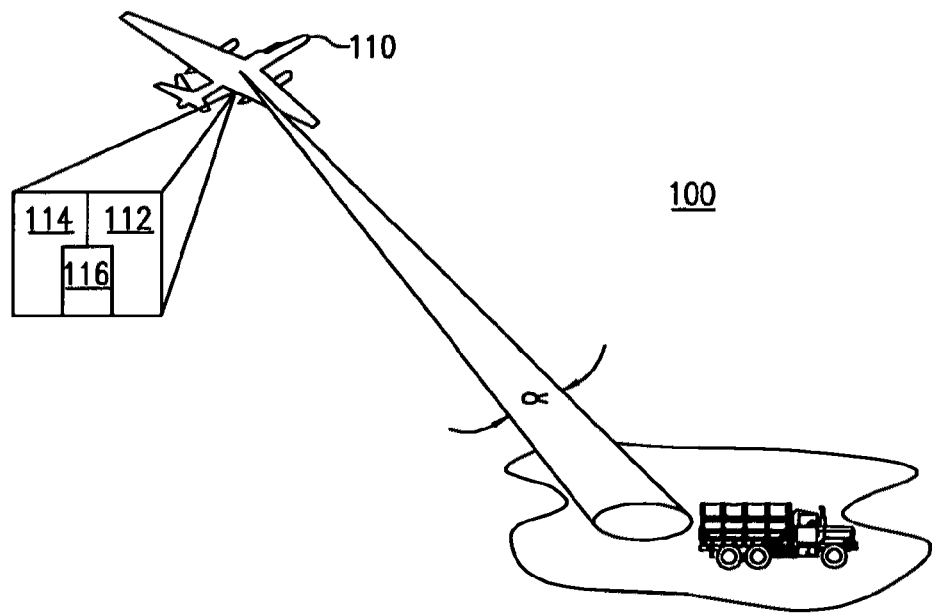
FIG. 1 is a pictorial diagram illustrating a portion of a system for carrying out a bidirectional retro-directional communication link.
Figure 2:
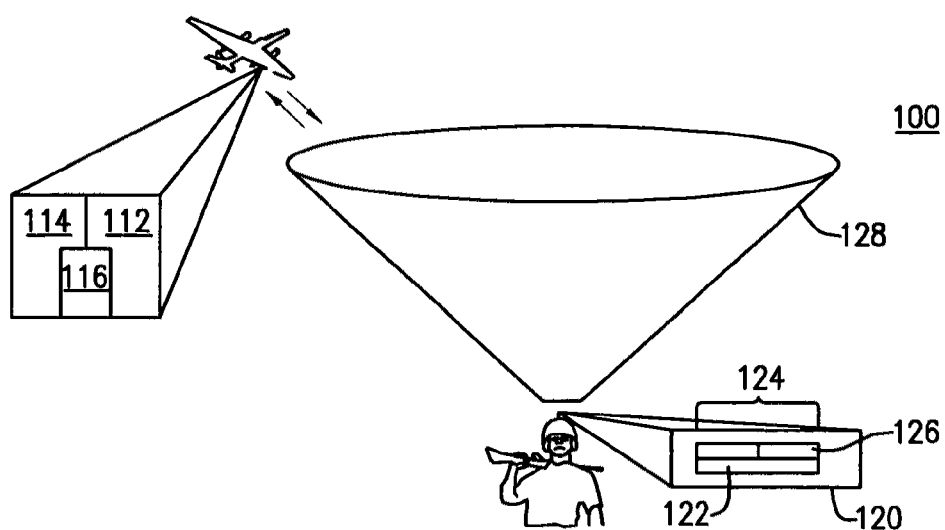
FIG. 2 is a pictorial diagram illustrating another portion of system for carrying out the bidirectional retro-directional communication link.

FIGS. 1 and 2 are pictorial diagrams illustrating a system 100 for carrying out a bidirectional retro-directional communication link. The system 100 includes a source 110 (FIG. 1) and a retro-directive target 120 (FIG. 2). Although shown as being carried by an aircraft, the source 110 may be located on the ground, in the air and/or in space.

The source 110 may include a high-power transmitter 112 for emitting electromagnetic energy and a receiver 114 for receiving the retro-reflected electromagnetic energy and the outgoing information. The source 110 may also include a target locator 116 that is operable to search for and locate the retro-directive target 120. The target locator 116 may be configured to search for the retro-directive target 120 using manual, fully-automatic or semi-automatic targeting. For example, the target locator 116 may be a manual targeting system, such as a system used for weapons deployment that is configured for a user (e.g., a pilot of an aircraft on which the source is disposed) to locate and identify the retro-directive target 120.

Alternatively, the target locator 116 may be a laser-based scanner that is configured to automatically, and typically, continuously scan a given field of view in search of the retro-directive target 120. To do this, the laser-based scanner may include a laser for emitting electromagnetic energy, and a receiving section for receiving from electromagnetic energy retro-reflected by the retro-directive target 120 a signal that has a given signature, which specifically identifies with the retro-directive target 120. As another alternative, the target locator 116 may be a combination of the manual targeting system and the laser-based scanner. Which of the levels of targeting is selected may depend upon conditions and environment for deployment of and/or a desired level of complexity and/or cost of the system 100.

The high-power transmitter 112 may include a laser that is operable to emit, as steered by the target locator 116, a collimated light beam ("emitted-light beam"). The emitted-light beam may be emitted at a wavelength within a human eye-safe spectral range, for instance, around 1550 nanometers ("nm"). Other wavelengths and electromagnetic energy types may be used as well.

The high-power transmitter 112 may modulate to emitted-light beam so it can carry information appended thereto for delivery to the retro-directive target 120 ("transmitter-appended information). This transmitter-generated information may be in the form of any or a combination of any of a digital, analog, encoded, unencoded, wavelength-multiplexed, and time-multiplexed signal.

The retro-directive target 120 includes a substrate 122 onto which is formed an active area 124. The substrate 122 may be fabricated from a plastic, metal and/or other material that is pliable, ductile and/or flexible.

The active area 124 is adapted to receive at least a portion of the collimated light beam ("received-light beam") and to retro-reflect some or the entire received-light beam back to the receiver 114 ("retro-reflected beam"). The retro-reflected beam may have information appended thereto for delivery to the receiver 114 ("target-appended information"). This target-appended information may be in the form of any, or a combination of any, of a digital, analog, encoded, unencoded, wavelength-multiplexed, and time-multiplexed signal, and may be different from any of the transmitter-appended information. To facilitate this, the active area 124 includes two or more corner mirrors 126, which are disposed in the substrate 122. The corner mirrors 126 may be disposed in the substrate 122 by molding, stamping, etc.

Each of the corner mirrors 126 defines an aperture that has a respective angle of acceptance with respect to the substrate 122 to be operable to retro-reflect the received-light beam within its respective angle of acceptance ("individual acceptance angle"). The corner mirrors 126 are arranged to provide a combined angle of acceptance ("combined acceptance angle") that is greater than any one of the individual acceptance angle. The combined acceptance angle is shown illustratively as a reflectivity cone 128 associated with the retro-directive target 120, which is affixed to head gear for military personnel.

Due to propagation in free space, the emitted-light beam gradually diverges at a given divergence angle, as represented by $\alpha$. This divergence angle $\alpha$ is generally determined by and inversely proportional to a waist of the emitted-light beam at an output of the high-power transmitter 112.

Given any significant distance between the source 110 and the retro-directive target 120, the emitted-light beam emanating from the output of the high-power transmitter 112 typically has a beam spot at a location of the retro-directive target 120 that is larger than the active area 124, thereby reducing available optical power for retro-reflection. This reduction may be quantified as an amount corresponding to a ratio between the active area 124 and area of the beam spot. Like the emitted-light beam, the retro-reflected beam also diverges as it propagates back to the source 110, which, in turn, causes a reduction in optical power of the retro-reflected beam. To limit these and other optical losses in a path between the source 110 and the retro-directive target 120, the corner mirrors 126 may define the combined acceptance angle to minimize optical losses for some, and typically all, orientations between the source 110 and the retro-directive target 120.

Figure 3A:
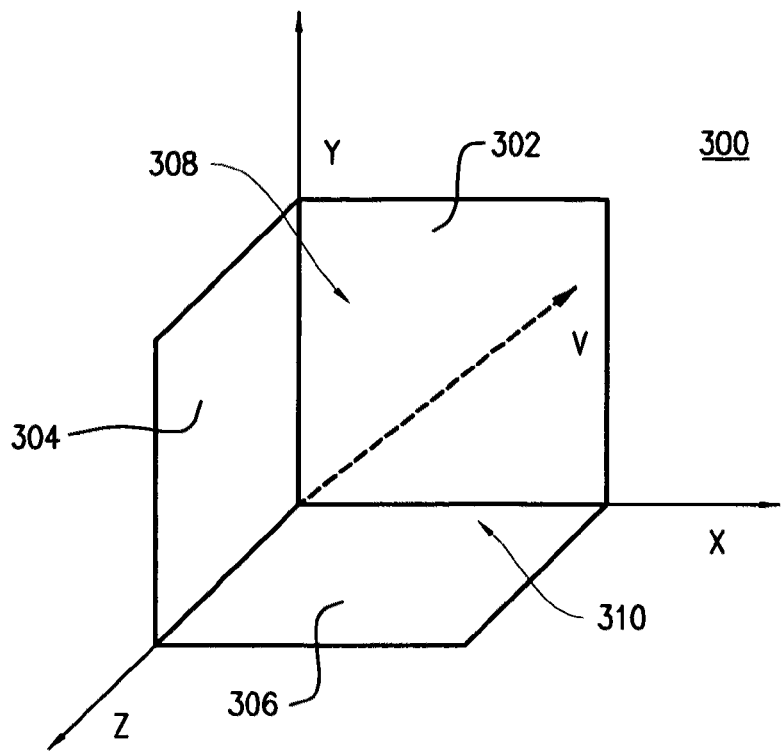
FIGS. 3A and 3B are graphical diagrams illustrating an example of a single corner mirror.
Figure 3B:
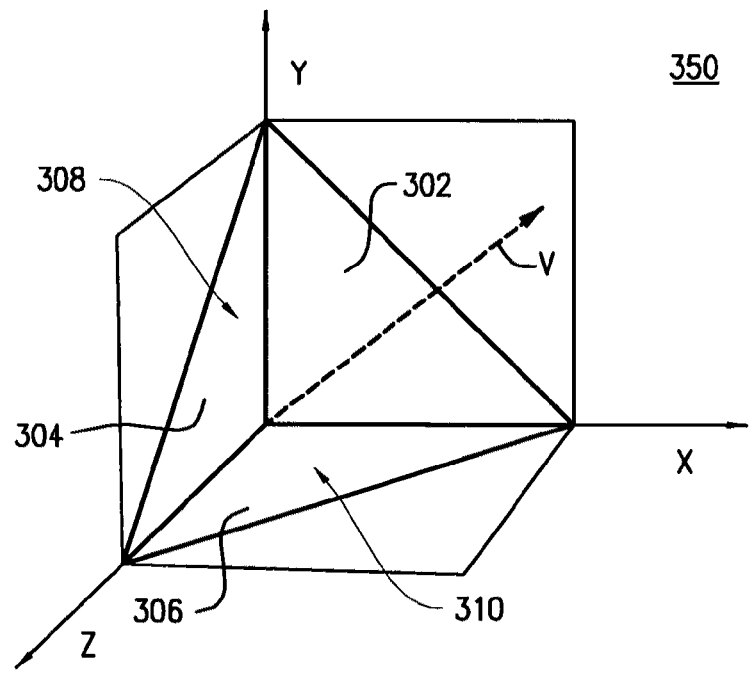

FIGS. 3A and 3B are graphical diagrams respectively illustrating two examples of a single corner mirror, such as one of the corner mirrors 126. As shown, FIG. 3A illustrates an example of a single corner-cube mirror 300 and FIG. 3B illustrates an example of a single truncated-corner mirror 350. Each of the corner-cube and truncated-corner mirrors 300, 350 may be defined by three reflective surfaces 302, 304 and 306 placed in orthogonal planes x-y, y-z and z-x, which, for exposition purposes, are shown aligned to a Cartesian coordinate system. These three reflective surfaces 302, 304 and 306, which may be formed using metal or metallic materials, form a cavity 308. The cavity 308 may have an aperture 310 that defines an opening for receiving a portion of the received-light beam to be retro-reflected.

A normalized reflectivity R of each of the corner-cube and truncated-corner mirrors 300, 350 for a unitary pointing vector V is approximated by:

$$R = xyz, \qquad \text{eq. (1)}$$

where x, y and z are orthogonal components of the unitary pointing vector V. Maximum reflectivity of 1 is achieved when:

$$V_{max} = \left(\frac{1}{\sqrt{3}}, \frac{1}{\sqrt{3}}, \frac{1}{\sqrt{3}}\right). \qquad \text{eq. (2)}$$

Given the aperture 310 is finite, an amount of reflectivity R strongly may depend on the unitary pointing vector V; that is, an amount of reflectivity R may depend upon the orientation of the received-light beam with respect to the aperture 310.

Figure 4:
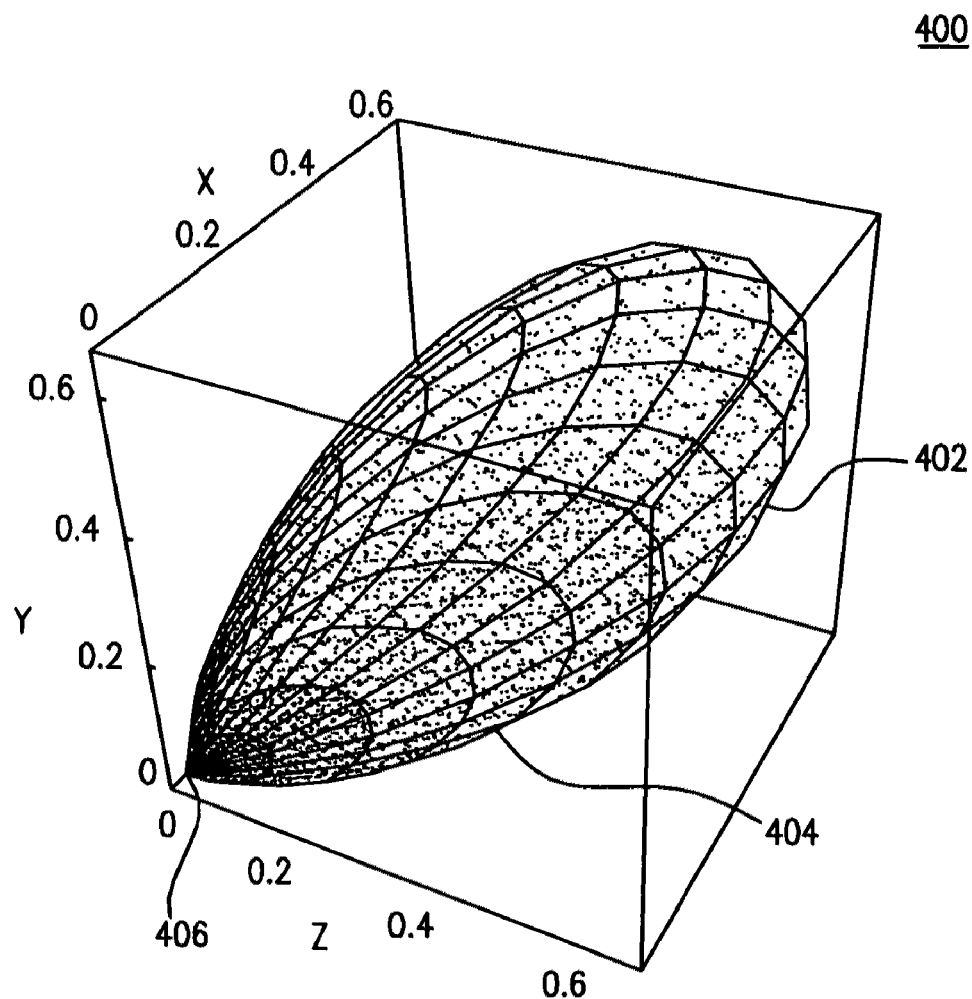
FIG. 4 is a graphical diagram illustrating a graph of a reflectivity cone verses a view angle in Cartesian coordinates for a single corner mirror.

With reference to FIG. 4, a graphical diagram illustrating a graph 400 of a reflectivity cone 402 verses a view angle in Cartesian coordinates for the single corner-cube mirror 300 is shown. The amount of reflectivity R is about equal to the distance between a point on the cone, such as point 404, and the origin 406 (i.e., the unitary pointing vector V associated with each point of the cone). In addition, the amount of reflectivity R drops to about zero at orientations close to x-y, y-z and z-x planes.

The individual acceptance angle of the corner-cube mirror 300 is generally defined as a full angular width at half-maximum reflectivity, which for the single corner-cube mirror 300 is about 45°. By disposing and arranging the plurality of corner mirrors 126 in the substrate 122 so at least two of the individual acceptance angles of the corner mirrors 126 with respect to said substrate 122 are different ("different orientations"), the combined acceptance angle the retro-directive target 120 may be larger than any one of the individual acceptance angles. In some instances, the different orientations may cause the combined acceptance angle of the retro-directive target 120 to exceed 90° and approach about 180°.

In addition, by miniaturizing the corner mirrors 126, a size of the active area 124, and in turn, a (e.g., an overall) size of the retro-directive target 120 may be selected for (i) minimizing such sizes; (ii) minimizing search and locate targeting; (iii) balancing size constraints against expected beam spots; and/or (iv) maximizing the combined angle of acceptance.

Alternative Target Architecture

Figure 5:
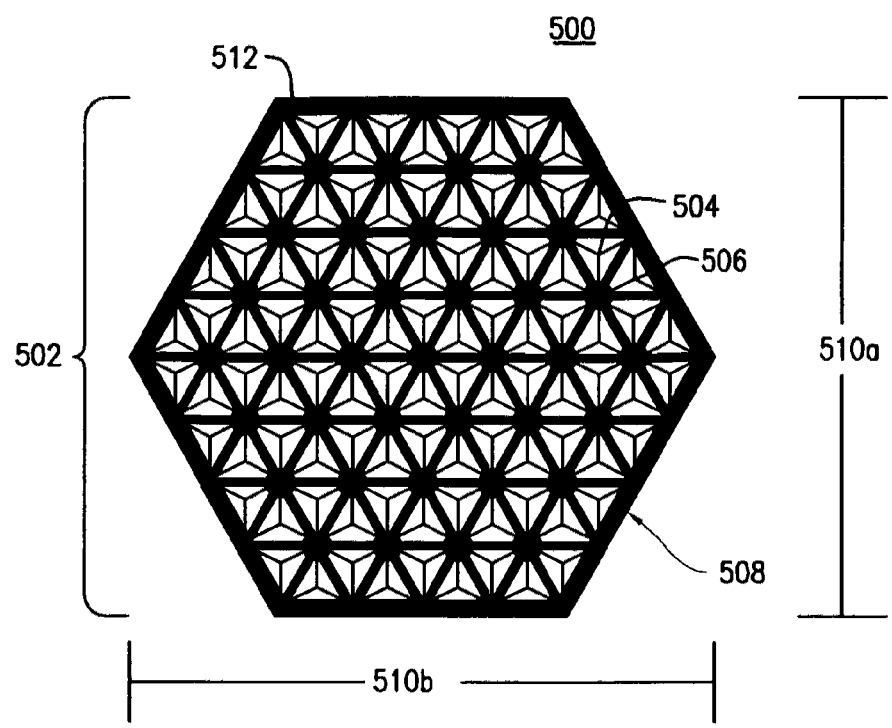
FIG. 5 is a block diagram illustrating a top view of an example of a retro-directive target in a form of a hexagonal matrix.

FIG. 5 is a block diagram illustrating a top view of an example of a retro-directive target 500 in a form of a hexagonal matrix. The retro-directive target 500 is similar to the retro-directive target 120 of FIG. 2, except as described herein. For convenience, the retro-directive target 500 is described herein with respect to the architecture shown in FIGS. 1 and 2.

The retro-directive target 500 includes an array 502 of corner mirrors, such as the corner mirrors 126, at least two of which have different orientations, namely, corner mirrors 504, 506. Given the reflectivity of the array 500 is determined by the sum of reflectivities of the corner mirrors 504, 506, the array 502 may be adapted to spread the different orientations of the corner mirrors 504, 506 across the retro-directive target 500 to control a shape and angular width of a reflectivity cone associated therewith.

Alternatively, the array 502 may be adapted to spread (e.g., by topological matching) four different orientations of corner mirrors (not shown) to provide a combined acceptance angle that is capable of receiving the emitted-light beam over an angular spread from about +45° north to about −45° south and from about +45° east to about −45° west in terms of cardinal coordinates measured from an axis for assessing the combined acceptance angle. The axis may, for example, extend perpendicular to a datum from which all four different orientations are referenced to (e.g., a datum that intersects each of the four different orientations of corner mirrors). When so adapted, the array 502 provides a combined angle of acceptance that is about double that of a single corner mirror. To increase the combined angle of acceptance and reflectivity of array 502, some or all cavities of the corner mirrors 504, 506 may be filled with transparent material having a high refractive index, such as glass and/or plastic.

In addition, the retro-directive target 500 defines an overall volume 508, an overall size 510a, 510b, and a given collective aperture 512, which is a collection of the apertures of each of the corner mirrors in the array 502. Each of the corner mirrors in the array 502 affects the overall volume 508 and overall size 510a, 510b. For instance, the overall volume 508 and overall size 510a, 510b may be decreased by approximately $N^{-1/2}$, where N is the number of corner mirrors in the array 502. Beneficially, the overall volume 508, and in turn, the overall size 510a, 510b are smaller than a single corner mirror having an aperture substantially the same as the collective aperture 504.

Figure 6A:
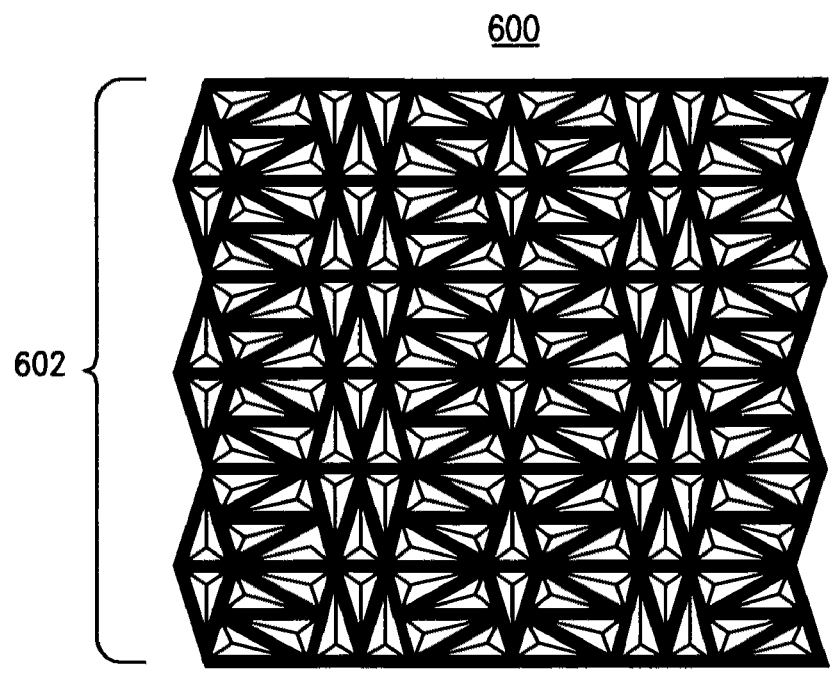
FIG. 6A is a block diagram illustrating a top view of an example of a retro-directive target.
Figure 6B:
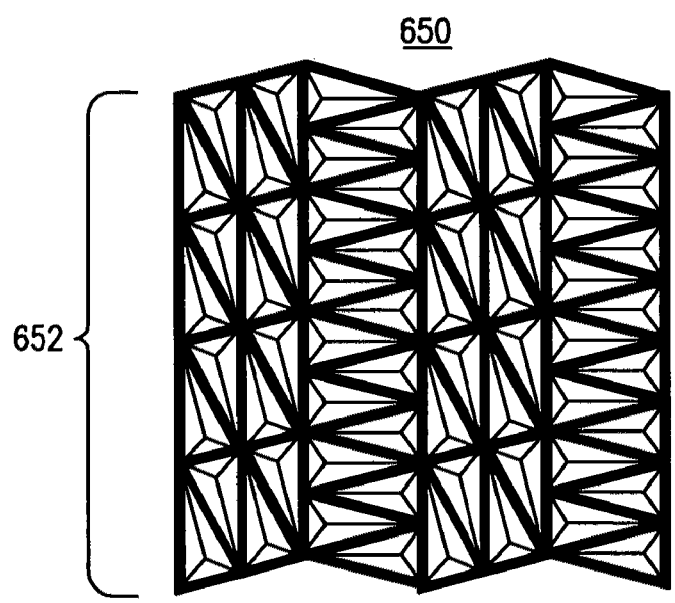
FIG. 6B is a block diagram illustrating a top view of another example of a retro-directive target.

FIGS. 6A and 6B are block diagrams illustrating top views of examples of two retro-directive targets 600, 650, respectively. Each of the retro-directive targets 600, 650 is similar to the retro-directive target 120 of FIG. 2, except as described herein. For convenience, the retro-directive targets 600, 650 are described herein with respect to the architecture shown in FIGS. 1 and 2.

The retro-directive targets 600, 650 include respective arrays 602, 652 of corner mirrors, such as the corner mirrors 126, at least two of which have different orientations. These different orientations of the corner mirrors of the arrays 602, 652 adapt the retro-directive targets 600, 650 to provide combined acceptance angles greater than 50°. Although not shown, the retro-directive targets 600, 650 may include respective arrays 602, 652 in which the different orientations are substantially random, as opposed to a given predetermined pattern.

Figure 7:
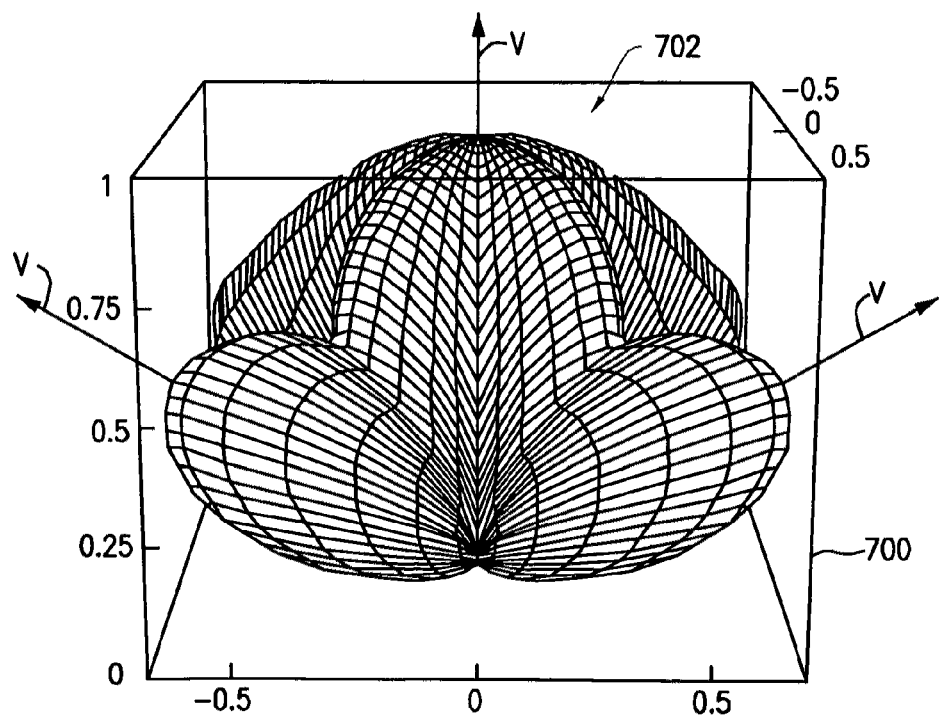
FIG. 7 is a graphical diagram illustrating an example of a graph of a calculated reflectivity cone for an array of corner mirrors that have five different orientations with respect to a substrate.

Referring now to FIG. 7, a graphical diagram illustrating an example of a graph 700 of a calculated reflectivity cone 702 for an array of corner mirrors that have five different orientations with respect to a substrate. These five orientations have respective unitary pointing vectors $V_{1-5}$ emanating from (0,0,0) to (0,0,1), (1,1,1), (−1,1,1), (1,−1,1) and (−1,−1,1), respectively. In this configuration, the reflectivity cone 702 covers about one half of a celestial hemisphere.

Figure 8A:
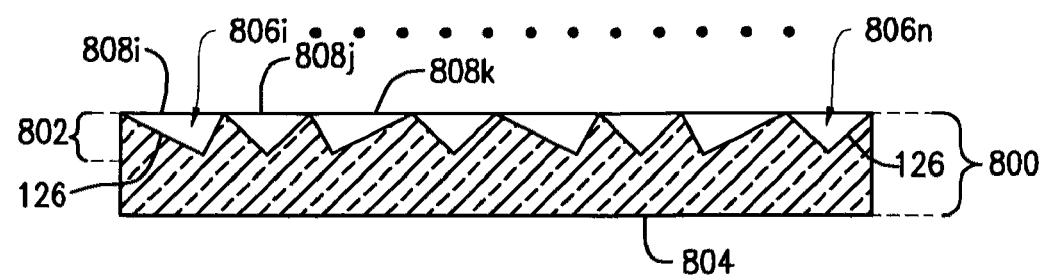
FIG. 8A is a block diagram illustrating a cross-section of an example of a retro-directive target.
Figure 8C:
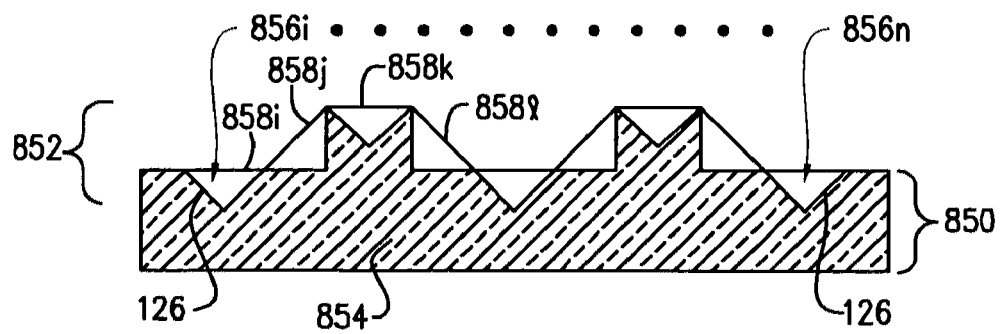
FIG. 8C is a block diagram illustrating a cross-section of another example of a retro-directive target.
Figure 8B:
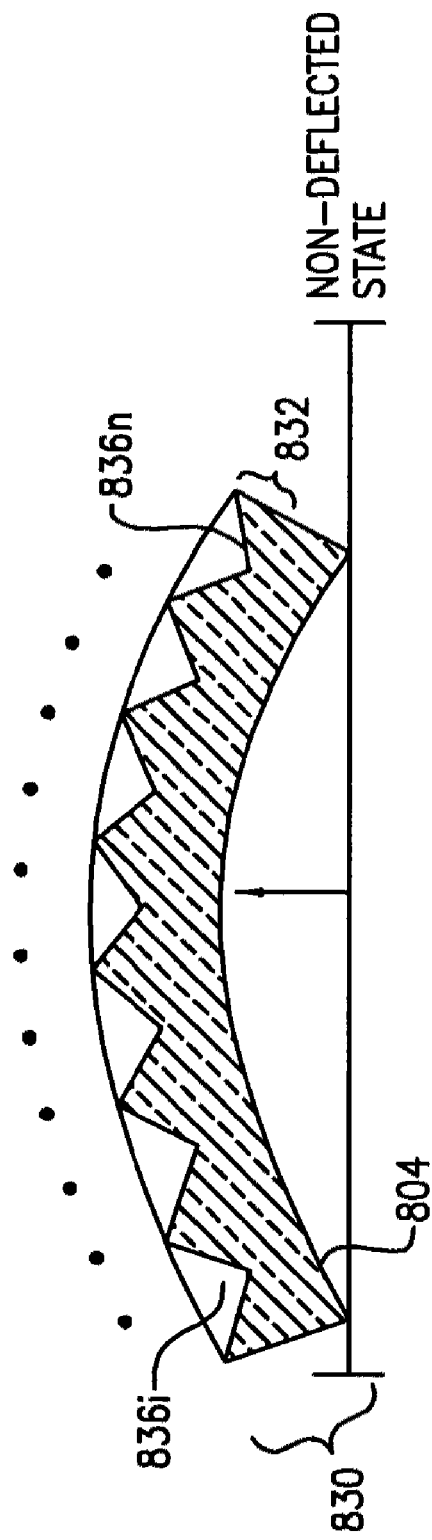
FIG. 8B is a block diagram illustrating a cross-section of another example of a retro-directive target.

Moving now to FIGS. 8A, 8B and 8C, block diagrams illustrating cross-sections of examples of retro-directive targets 800, 830, and 850, respectively, are shown. Each of the retro-directive targets 800, 830, 850 is similar to the retro-directive target 120 of FIG. 2, except as described herein. For convenience, the retro-directive targets 800, 830, 850 are described herein with respect to the architecture shown in FIGS. 1 and 2.

The retro-directive target 800 includes an array 802 of corner mirrors, such as corner mirrors 126, disposed on a flat substrate 804, which may be formed from a transparent material, such as glass or plastic, or a non-transparent material, such as ceramic. The flat substrate 804 includes a plurality of receptacles $806_i$-$806_n$; each of which is operable to receive one or more of the corner mirrors 126. These receptacles $806_i$-$806_n$ may be formed by stamping, molding, etc., with or without simultaneous reception of the corner mirrors 126. The corner mirrors 126 of array 802 may be arranged in three different orientations, namely, first, second and third orientations $808_i$, $808_j$ and $808_k$, which in turn, provide a combined acceptance angle of about 120°.

The retro-directive target 830 includes an array 832 of corner mirrors, such as corner mirrors 126, disposed on a flexible substrate 834, which, as shown, is deflected from its non-deflected state. This deflection may be temporary, permanent and/or reconfigurable.

The flexible substrate 834, which may be formed from a transparent or non-transparent material, includes a plurality of receptacles $836_i$-$836_n$. Each of the receptacles $836_i$-$836_n$ is operable to receive one or more of the corner mirrors 126. The receptacles $836_i$-$836_n$ may be formed by stamping, molding, etc., with or without simultaneous reception of the corner mirrors 126.

The corner mirrors 126 of array 832 may be arranged in a number of different orientations when the substrate 834 is in its non-deflected state, including having the unitary pointing vector V of each of the corner mirrors facing outwardly from or inwardly towards the flexible substrate 834. To obtain a desired diversity of orientations, the substrate 834 may be deflected so as to cause the corner mirrors 126 of array 832 to be arranged into orientations that provide a desired combined acceptance angle. This desired combined acceptance angle can range from about 60° to about 180°.

To avoid corner shape distortions, portions of the corner mirrors 126 can be reinforced with a sturdy, inflexible material, such as sheet metal or ceramic. This way, portions of the flexible substrate 834 that reside between the corner-mirrors 126 are able to flex and stretch with the deflection of the flexible substrate 834.

Moving to FIG. 8C, the retro-directive target 850 includes an array 852 of corner mirrors, such as corner mirrors 126, disposed on a corrugated substrate 854. The corrugated substrate 854 may be formed from a transparent material, such as glass or plastic, or a non-transparent material, such as ceramic, and include a plurality of receptacles $856_i$-$856_n$.

Each of the receptacles $856_i$-$856_n$ is operable to receive one or more of the corner mirrors 126. The receptacles $856_i$-$856_n$ may be formed by stamping, molding, etc. with or without simultaneous reception of the corner mirrors 126. The corner mirrors 126 of array 852 may be arranged in four different orientations, namely, first, second, third and fourth corrugated orientations $858_i$, $858_j$, $858_k$ and $858_l$, which in turn, provide a combined acceptance angle of from about 120° to about 150°.

The corrugated substrate 854 may provide a larger and more efficient surface area for disposing the array 852 of corner mirrors than a surface area provided by the flat substrate 804. The larger and more efficient surface area, in turn, may cause the retro-directive target 850 to exhibit a larger reflectivity and a larger combined acceptance angle as compared to that of the retro-directive target 800 when the flat substrate 804 is of similarly size to the corrugated substrate 854. In manufacturing, pattering of the flat, flexible and corrugated substrates 804, 834 and 854 for the arrays 802, 832 and 852 may be done using similar molding or stamping processes without a substantial increase in manufacturing complexity.

Figure 9B:
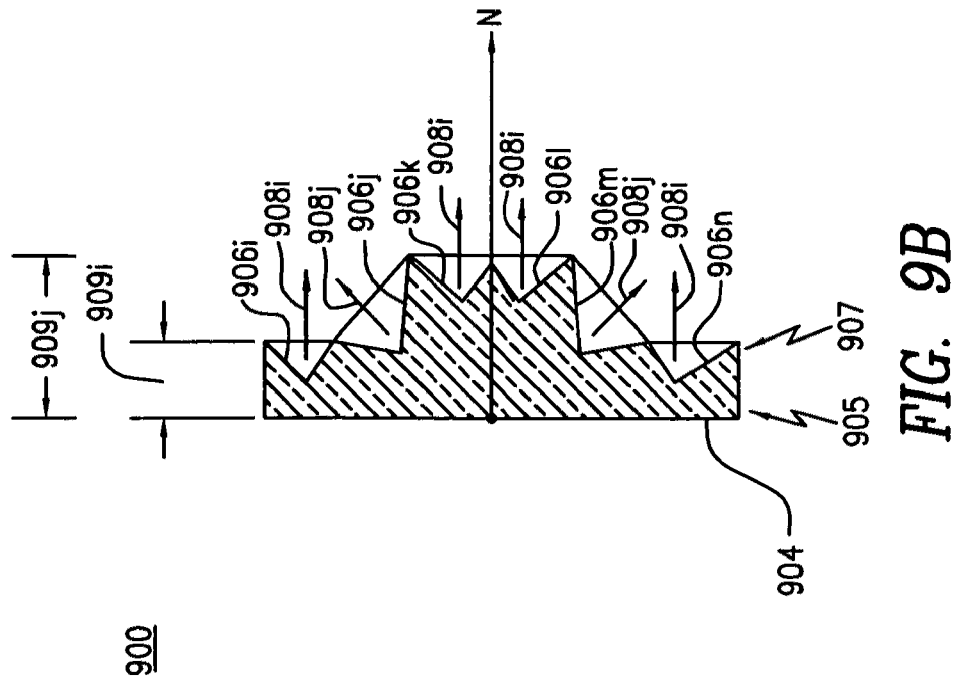
FIGS. 9A and 9B are block diagrams respectively illustrating top and cross-sectional views of an example of a retro-directive target.
Figure 9A:
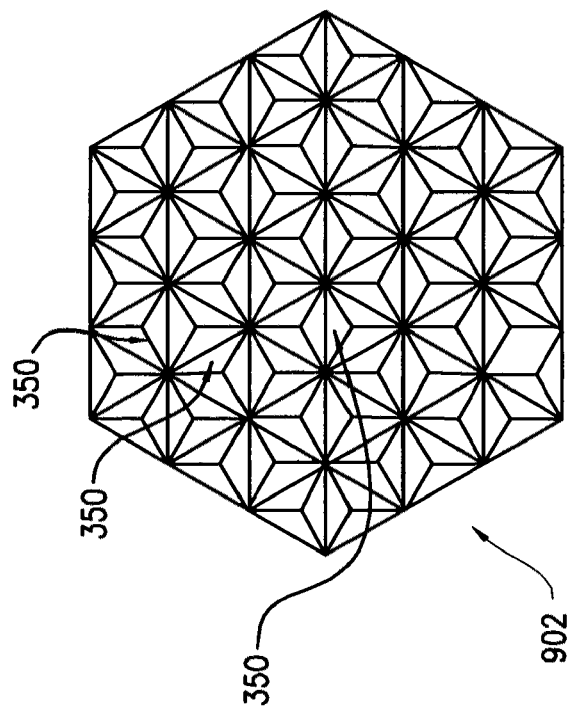

FIGS. 9A and 9B are block diagrams respectively illustrating top and cross-sectional views of an example of a retro-directive target 900. The retro-directive target 900 is similar to the retro-directive target 120 of FIG. 2, except as described herein. For convenience, the retro-directive target 900 is described herein with respect to the architecture shown in FIGS. 1, 2, 3A, 3B and 8.

The retro-directive target 900 includes an array 902 of corner mirrors disposed on a corrugated substrate 904 and arranged into a hexagon. The corrugated substrate 904 may be formed from a transparent material, such as glass or plastic, or a non-transparent material, such as ceramic.

In addition, the corrugated substrate 904 includes an un-corrugated surface 905, and a corrugated surface 907. The corrugated surface 907 defines first-level and second-level corrugations $909_i$, $909_j$. These first-level and second-level corrugations $909_i$, $909_j$ have first and second elevation, respectively, as referenced from the un-corrugated surface 905. The first-level corrugation $909_i$ includes receptacles $906_i$, $906_j$, $906_m$ and $906_n$; each of which defines an aperture that resides, primarily, within the first elevation. The second-level corrugation $909_j$ includes receptacles $906_k$ and $906_l$, each of which defines an aperture that resides, primarily, within the second elevation.

Consistent with other receptacles described herein, each of the receptacles $906_i$-$906_n$ is operable to receive one or more of the corner mirrors; each of which may be a truncated-corner mirror 350. Each of the first-level and second level receptacles $906_i$-$906_n$ may be formed by stamping, molding, etc. with or without simultaneous reception of the truncated-corner mirrors 350. Alternatively, any of the receptacles $906_i$-$906_n$ may consist of an un-depressed surface of the corrugated substrate 904 that may be adapted to receive one or more of the truncated-corner mirrors 350.

The first and second level receptacles $906_i$-$906_n$ may be arranged so that the unitary-pointing vectors of the truncated-corner mirrors 350 disposed therein define first and second orientations $908_i$, $908_j$. Each of the first and second orientations $908_i$, $908_j$ may be defined with respect to a vector N, which extends from the un-corrugated surface 905 through a center of the hexagon disposed the corrugated surface 907 at an angle normal to the un-corrugated surface 905.

For example, the first-level receptacles $906_i$ and $906_n$ and the second-level receptacles $906_k$ and $906_l$ may define the first orientation 908, by being arranged so that the unitary-pointing vectors of the truncated-corner mirrors 350 disposed in such receptacles point outwardly from the corrugated surface 907 at an angle from the vector N of about 0°. The remaining first-level receptacles $906_j$ and $906_m$ may define the second orientation $908_j$ by being arranged so that the unitary-pointing vectors of the of the truncated-corner mirrors 350 disposed in such receptacles point outwardly from the corrugated surface 907 at an angle from the vector N between about 0° and about 90°. When this angle is about 45° from the vector N, and the first orientation $908_i$ is as defined directly above, the retro-directive target 900 may provide a combined acceptance angle of about 130°.

As an alternative, the first-level receptacles $906_i$ and $906_n$ and the second-level receptacles $906_k$ and $906_l$ may define the first orientation $908_i$ by being arranged so that the unitary-pointing vectors of the truncated-corner mirrors 350 disposed in such receptacles point inwardly toward the un-corrugated surface 907 at an angle from the vector N of about 180°. In addition, the remaining first-level receptacles $906_j$ and $906_m$ may define the second orientation $908_j$ by being arranged so that the unitary-pointing vectors of the of the truncated-corner mirrors 350 disposed in such receptacles point inwardly toward the un-corrugated surface 907 at an angle from the vector N between about 90° and about 180°. When (i) this angle is about 135° from the vector N, (ii) the first orientation $908_i$ is as defined directly above, and (iii) the corrugated substrate 904 is made from a transparent material having a refractive index of about 1.8, the retro-directive target 900 may provide a combined acceptance angle from about 130° to about 150°.

Figure 9D:
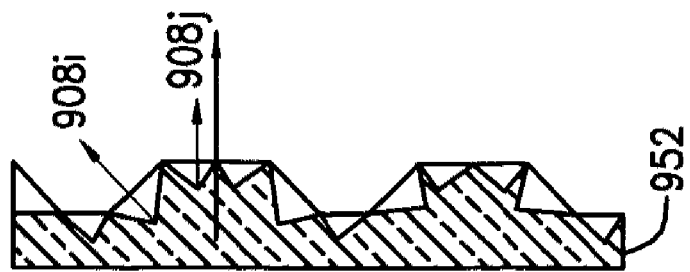
FIGS. 9C and 9D are block diagrams respectively illustrating top and cross-sectional views of another example of a retro-directive target.
Figure 9C:
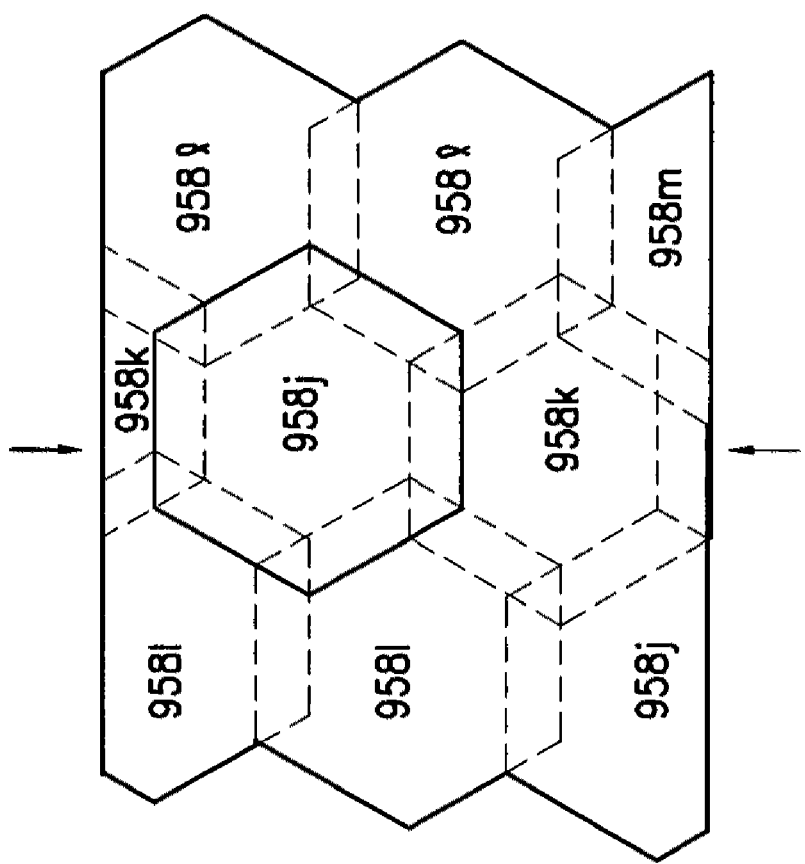

FIGS. 9C and 9D are block diagrams respectively illustrating top and cross-sectional views of another example of a retro-directive target 950. The retro-directive target 950 is similar to the retro-directive target 120 of FIG. 2, except as described herein. For convenience, the retro-directive target 900 is described herein with respect to the architecture shown in FIGS. 1, 2, 3A, 3B, 9A and 9B.

The retro-directive target 950 includes an array 952 of corner mirrors disposed on a corrugated substrate 954. The array 902 defines a repetitious pattern of staggered and partially-overlapping hexagonal regions $956_i$, $956_j$, $956_k$ and $956_l$ and truncated-hexagonal regions $958_i$, $958_j$, $958_k$, $958_l$ and $958_m$. Each of the hexagonal regions $956_i$, $956_j$, $956_k$ and $956_l$, may take the form of the retro-directive target 900 (FIG. 9); and each of the truncated-hexagonal regions $958_i$, $958_j$, $958_k$, $958_l$ and $958_m$ may take the form of an appropriately truncated version of the retro-directive target 900.

The unitary-pointing vectors of each of the truncated-corner mirrors of the hexagonal regions $956_i$, $956_j$, $956_k$ and $956_l$ and truncated-hexagonal regions $958_i$, $958_j$, $958_k$, $958_l$ and $958_m$ typically all face outwards from or inwards towards the corrugated substrate 952 in accordance with the first and second orientations $908_i$, $908_j$. The repetitious pattern, as shown, allows the retro-directive target 950 to provide a combined acceptance angle from about 130° to about 150°.

Figure 10A:
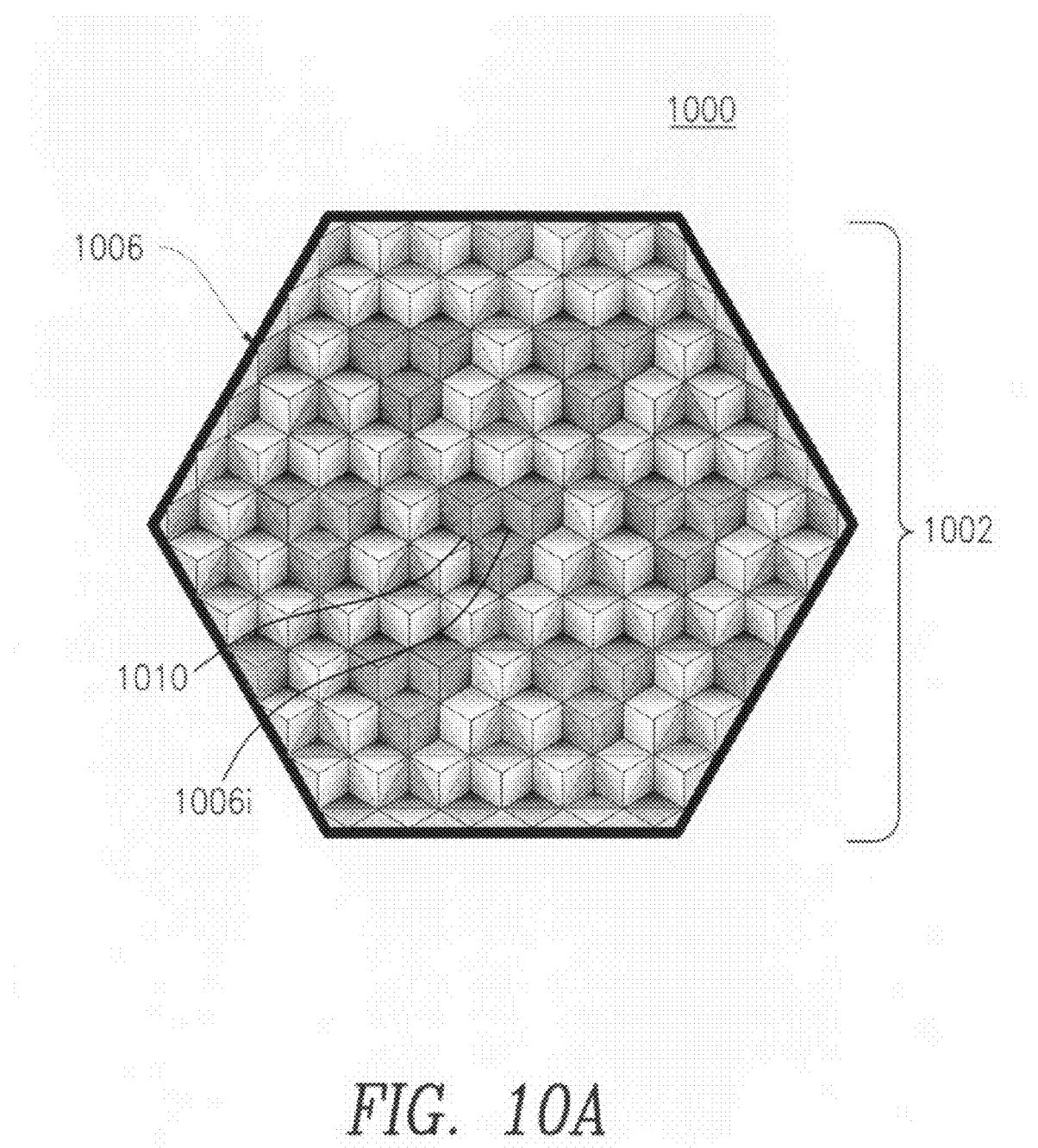
FIGS. 10A, 10B and 10C are block diagrams respectively illustrating several top views of another example of a retro-directive target.
Figure 10B:
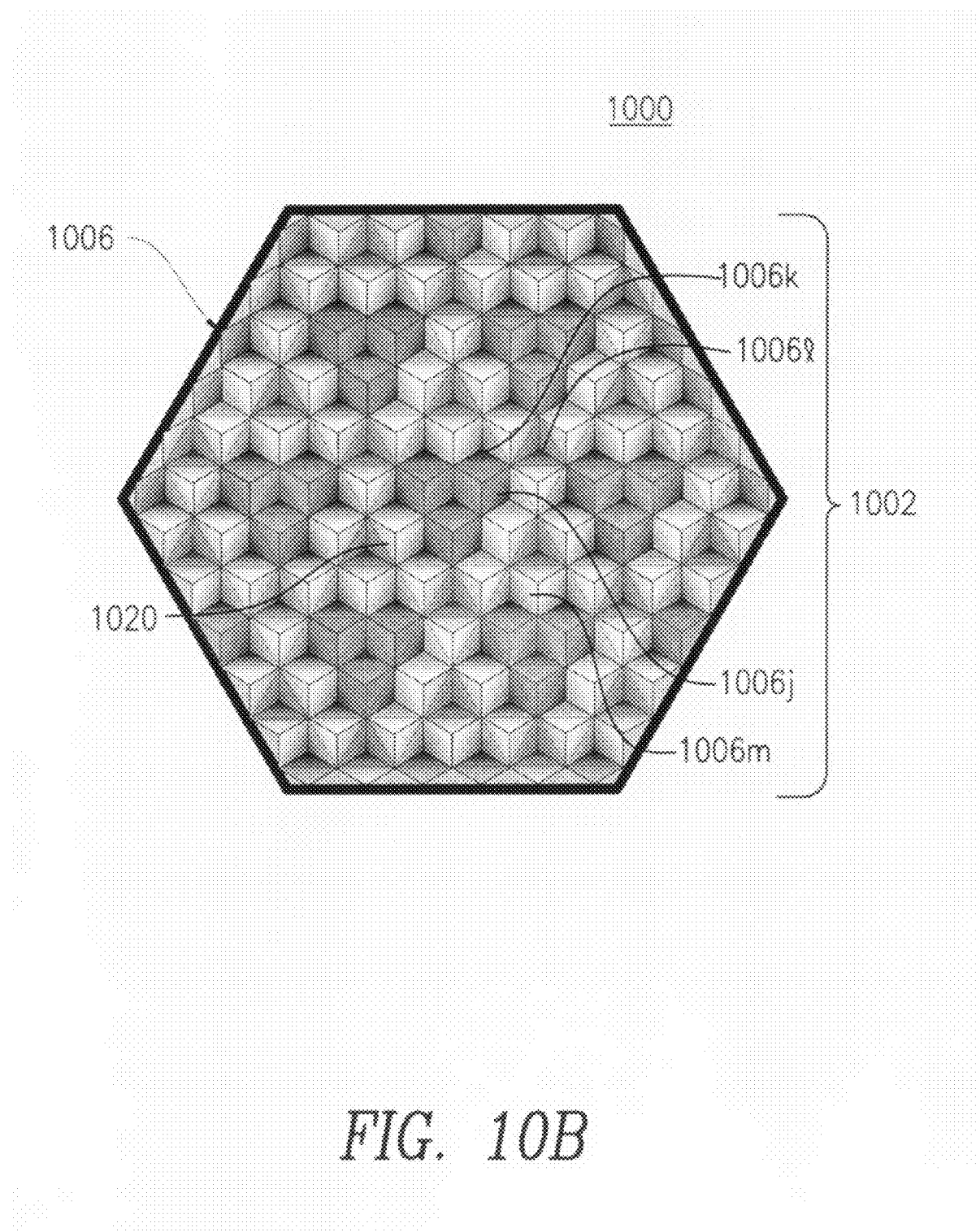
Figure 10C:
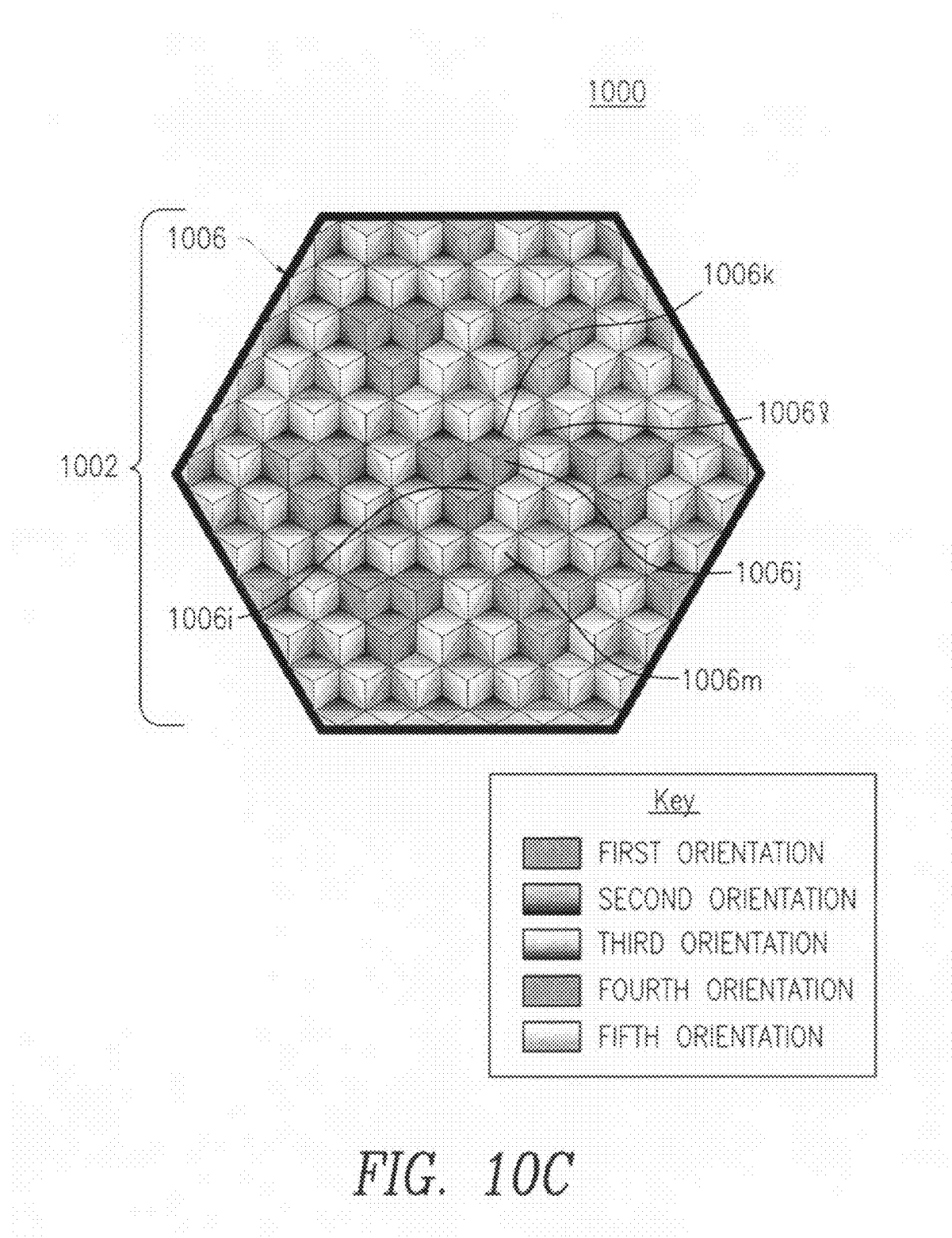

FIGS. 10A, 10B and 10C are block diagrams respectively illustrating several top views of another example of a retro-directive target 1000. This retro-directive target 1000 is similar to the retro-directive target 120 of FIG. 2, except as described herein. For convenience, the retro-directive target 1000 is described herein with respect to the architecture shown in FIGS. 1, 2, 3A, 3B and 8. In addition, the shading shown in the FIGS. 10A, 10B and 10C is for reference and for clarity of description, and is not indicative of reflectivity or other feature of the retro-directive target 1000 or any part thereof.

With reference to both FIG. 10A and FIG. 10B, the retro-directive target 1000 includes an array 1002 of corner mirrors disposed over a substrate (not shown). The substrate may be formed from a transparent material, such as glass or plastic, or a non-transparent material, such as ceramic. In addition, the substrate includes a patterned surface disposed under the array 1002, and an un-patterned surface disposed under and separated from the patterned surface.

Consistent with other substrates described herein, this substrate may include a plurality of receptacles, shown generally as receptacles 1006. Each of the receptacles 1006 may be formed by stamping, molding, etc. with or without simultaneous reception of at least one of the corner-cube mirrors 300 or the truncated-corner mirrors 350. Alternatively, any of the receptacles 1006 may consist of an un-depressed surface of the substrate that may be adapted to receive at least one of the corner-cube mirrors 300 or the truncated-corner mirrors 350.

Each of the receptacles 1006 may be arranged so as to conform to one of at least five different orientations with respect to a first measurement vector (shown as point N) and a second measurement vector M. The first measurement vector N extends from the un-patterned surface through a center of the hexagon at an angle normal to the un-patterned surface; and the second measurement vector M extends from the un-patterned surface starting at the center of the hexagon at an angle substantially parallel to the to the un-patterned surface.

For example, receptacle $1006_i$, which is contained within triangular reference 1010 (shown for exposition purposes only and is not part of the retro-directive target 1000), may define a first orientation by being arranged to receive a corner-cube mirror 300 having its unitary-pointing vector point outwardly from the substrate at an angle from the given vector of about 0°. Similarly, receptacle $1006_j$, which is contained within triangular reference 1020 (shown for exposition purposes only and is not part of the retro-directive target 1000), may define a second orientation by being arranged to receive a truncated-corner mirror 350 having its unitary-pointing vector point outwardly from the substrate at (i) an angle from the first measurement vector N between about 0° and about 90° and (ii) an angle from the second measurement vector M of about 120°.

In addition, receptacle $1006_k$, which is also contained within triangular reference 1020, may define a third orientation by being arranged to receive a corner-cube mirror 300 having its unitary-pointing vector point outwardly from the substrate at (i) an angle from the first measurement vector N between about 0° and about 90°, and (ii) an angle from the second measurement vector M of about 0°. Receptacle $1006_l$, which is contained within triangular reference 1020, may define a fourth orientation by being arranged to receive a truncated-corner mirror 350 having its unitary-pointing vector point outwardly from the substrate at (i) an angle from the first measurement vector N between about 0° and about 90°, and (ii) an angle from the second measurement vector M of about 240°. Receptacle $1006_m$, which is located outside the triangular reference 1020, may define a fifth orientation by being arranged to receive a corner-cube mirror 300 having its unitary-pointing vector point outwardly from the substrate at an angle from the first measurement vector M of about 0°.

With reference now to FIG. 10C, each of the corner mirrors of the array 1002 are shaded to illustrate its orientation with respect to the given vector. For example, the corner mirrors shaded the same as the corner mirror disposed in the receptacle 1006, are oriented according to the first orientation. Similarly, the corner mirrors shaded the same as the corner mirror disposed in the receptacle $1006_j$, $1006_k$ $1006_l$ and $1006_m$ are oriented according to the first, second, third and fourth orientations, respectively. When the retro-directive target 1000 is configured as shown, the array 1002 exhibits a pattern that can be topologically self-consistent due to the deployment of both corner-cube and truncated-corner mirrors. In addition, the retro-directive target 1000, when so configured, may provide a combined acceptance angle from about 50° to about 150°

Figure 11:
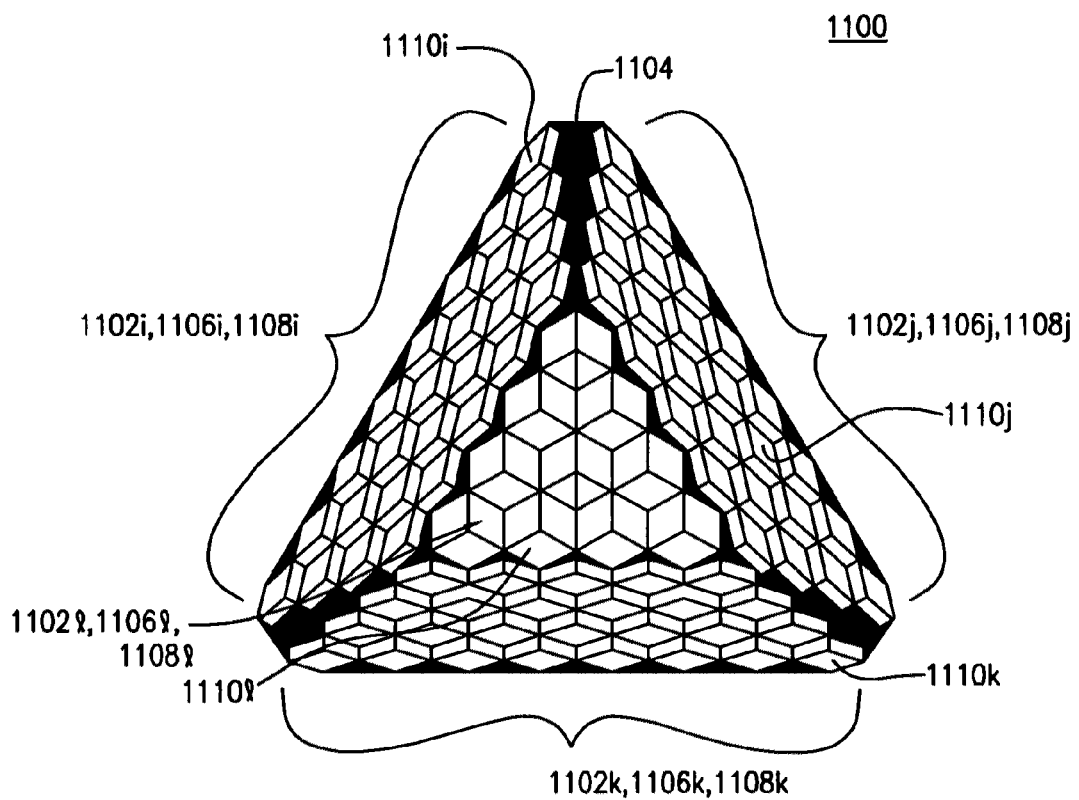
FIG. 11 is a block diagram illustrating another example of a retro-directive target.

Referring now to FIG. 11, a block diagram illustrating another example of a retro-directive target 1100 is shown. This retro-directive target 1100 is similar to the retro-directive target 120 of FIG. 2, except as described herein. For convenience, the retro-directive target 1100 is described herein with respect to the architecture shown in FIGS. 1, 2 and 3A.

The retro-directive target 1100 includes a first array $1102_i$, a second array $1102_j$, a third array $1102_k$, and a fourth array $1102_l$ of corner mirrors disposed over a substrate 1104 that is formed as a truncated three-sided pyramid. Each of the arrays $1102_i$, $1102_j$, $1102_k$, and $1102_l$ may include a plurality of corner-cube mirrors, each of which may take the form of the corner-cube mirror 300 shown in FIG. 3A.

The substrate 1104 includes a first face $1106_i$, a second face $1106_j$, a third face $1106_k$, and a top face $1106_l$. Disposed on the first face 1106, is a first region of receptacles $1108_i$. Similarly, disposed on the second, third and top faces $1106_j$, $1106_k$, and $1106_l$ are second, third and top regions of receptacles $1108_j$, $1108_k$, and $1108_l$; which, in turn, define respective orientations $1110_i$, $1110_j$, $1110_k$ and $1110_l$. Each of the receptacles in the first, second, third and top regions of receptacles $1108_i$-$1108_l$, is operable to receive one or more of the corner-cube mirrors at their respective orientations $1110_i$, $1110_j$, $1110_k$ and $1110_l$.

To obtain a nearly self-consistent pattern without the use of truncated corner mirrors, the first, second, third and top orientations $1110_i$, $1110_j$, $1110_k$ and $1110_l$ may be defined as follows. The first orientation $1110_i$ may be defined to orient the corner-cube mirrors so that (i) the aperture of each of the corner-cube mirrors face outwardly from the first face $1106_i$, and (ii) the unitary pointing vector V for each of the corner-cube mirrors points outwardly at an angle of about 90° from the first face $1106_i$. Likewise, each of the second, third and top orientations $1110_j$, $1110_k$ and $1110_l$ may be defined to orient the corner-cube mirrors so that (i) the aperture of such corner-cube mirrors face outwardly from the respective faces $1106_j$, $1106_k$ and $1106_l$, and (ii) the unitary pointing vector V for each of the corner-cube mirrors points outwardly at an angle of about 90° from the respective faces $1106_j$, $1106_k$ and $1106_l$. When configured as such, the orientations $1110_i$, $1110_j$, $1110_k$ and $1110_l$ may cause the retro-directive target 1000 to have a combined acceptance angle from about 50° to about 100°.

Alternatively, each of the orientations $1110_i$, $1110_j$, $1110_k$ and $1110_l$ may orient the corner-cube mirrors so that the unitary pointing vector V of each of the corner-cube mirrors points outwardly at an angle from about from about −45° to about +45°. When configured this way, the orientations $1110_i$, $1110_j$, $1110_k$ and $1110_l$ may cause the retro-directive target 1000 to have a combined acceptance angle from about 90° to about 150°.

As above, each of the receptacles of the first, second, third and top regions of receptacles $1108_i$-$1108_n$ may be formed by stamping, molding, etc. with or without simultaneous reception of the corner-cube mirrors. Alternatively, one or more of the receptacles of the first, second, third and top regions of receptacles $1108_i$-$1108_n$ may take the form of an un-depressed surface of the first, second, third and top faces $1106_i$, $1106_j$, $1106_k$, and $1106_l$, respectively, that may be adapted to receive one or more of the corner-cube mirrors.

Referring now back to FIGS. 1, 2 and 3, the retro-directive target 120 (and each of the other examples contemplated hereunder) is operable to preserve a relatively high degree of directivity and collimation of the retro-reflected beam so as to facilitate visibility and delectability by the receiver 114 and or target locator 116 from a range of distances of a few centimeters up to a range of tens of kilometers. Given that divergence of the retro-reflected beam is partly determined by its diffraction on each aperture 310 of the corner mirrors 126 (i.e., the divergence angle is inversely proportional to a dimension of each aperture 310 in a direction normal to the retro-reflected beam propagation), the size of each aperture 310 of the corner mirrors 126 may be selected to overcome a threshold that limits visibility and delectability by the receiver 114 and or target locator 116 from a range of a few to tens of kilometers. This threshold, while easily overcome by the retro-directive target 120 (and each of the other examples contemplated hereunder), hinders the use of conventional retro-reflective devices for carrying out bidirectional communications.

Example Communication Apparatus Architecture

Figure 12:
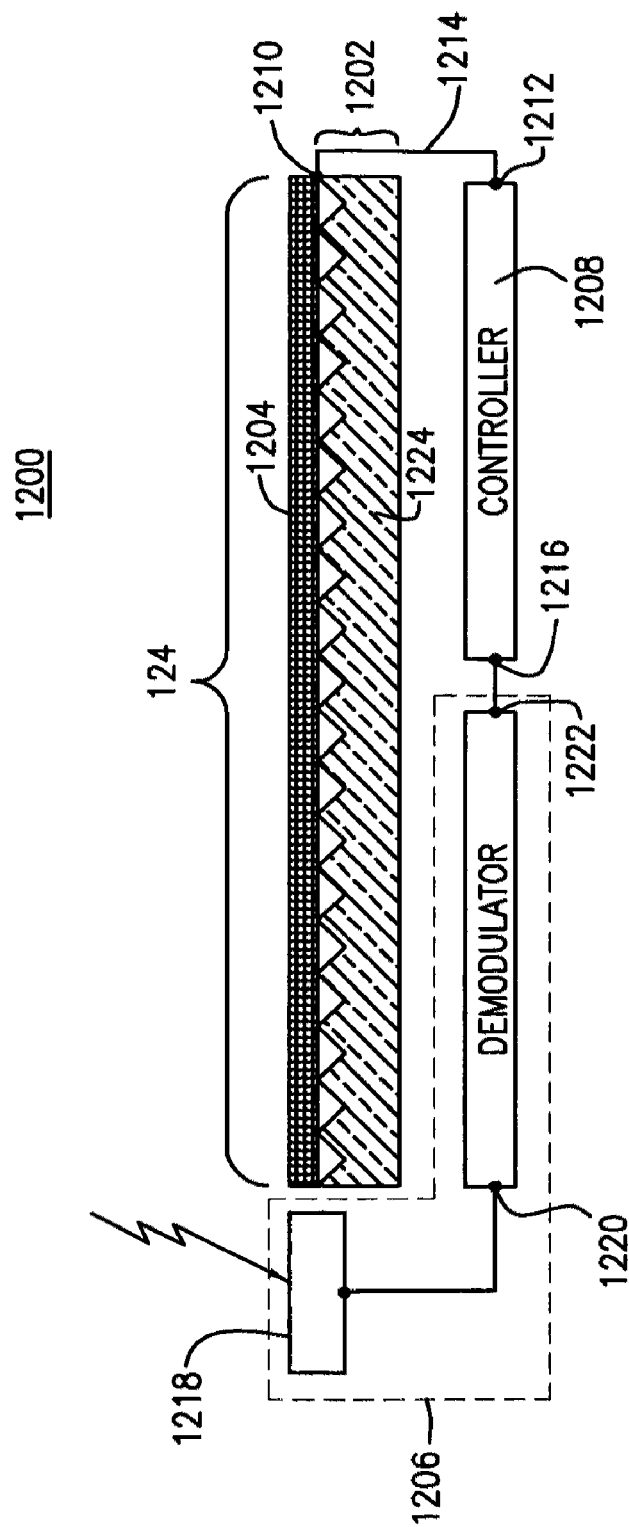
FIG. 12 is a block diagram illustrating an example of an apparatus for retro-reflecting electromagnetic energy for a bidirectional retro-directional communication.

FIG. 12 is a block diagram illustrating an example of an apparatus 1200 for retro-reflecting electromagnetic energy for a bidirectional retro-directional communication. The apparatus 1200 includes a retro-directive target 1202, at least one modulator 1204, a signal detector 1206 and a controller 1208. The retro-directive target 1202 is similar to the retro-directive target 120 of FIG. 2 (and each of the other examples contemplated hereunder), except as described herein. For convenience, the apparatus 1200 is described herein with respect to the architecture shown in FIGS. 1 and 2.

Figure 13A:
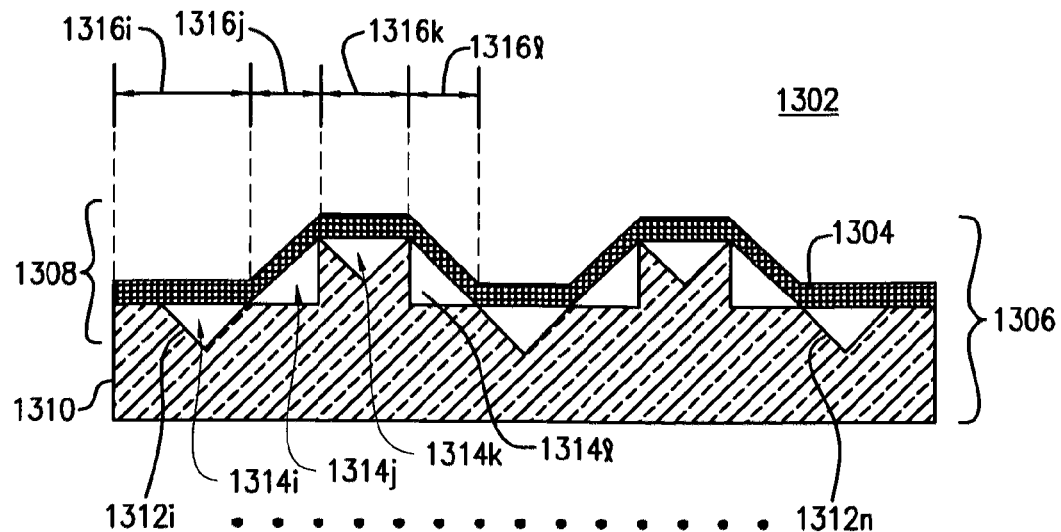
FIG. 13A is a block diagram illustrating an example of a cross-section of a modulator enhanced retro-directive-target.
Figure 13B:
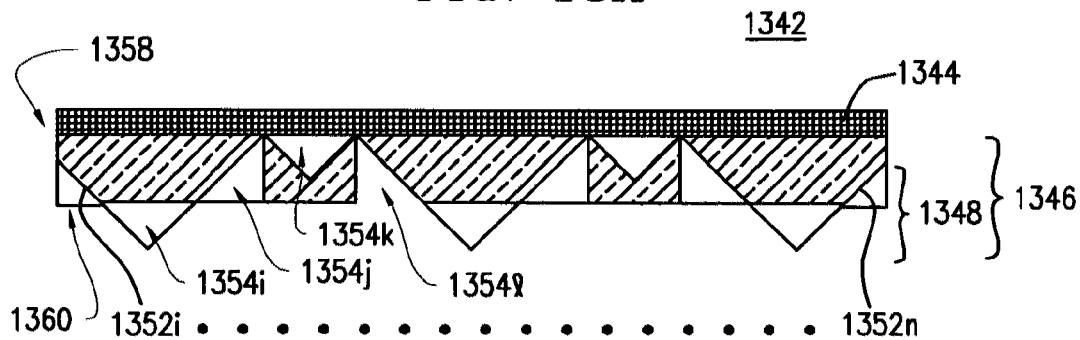
FIG. 13B is an block diagram illustrating an example of a cross-section of another modulator enhanced retro-directive-target.
Figure 13C:
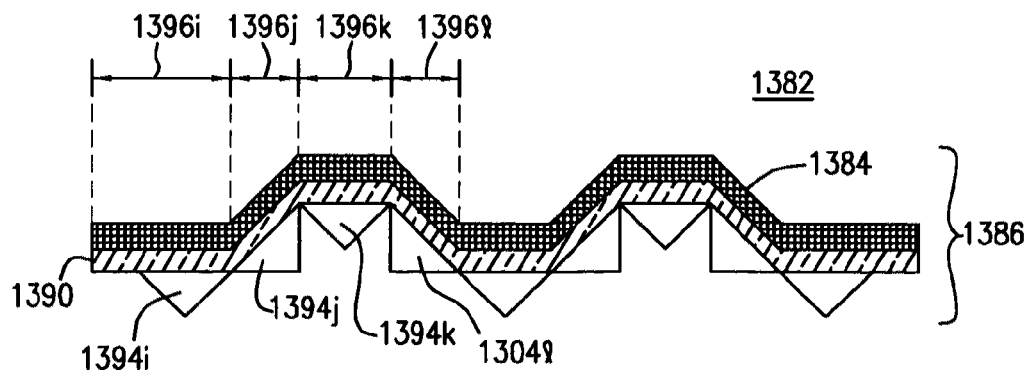
FIG. 13C is a block diagram illustrating an example of a cross-section of another modulator enhanced retro-directive-target.

The modulator 1204, which may take the form of any of the modulators 1304, 1344 and 1384 described below with reference to FIGS. 13A-C, is operable to modulate any of an intensity, a phase and/or a polarization of the retro-reflected beam to incorporate the target-appended information. As noted above, this target-appended information may be in the form of any, or a combination of any, of a digital, analog, encoded, unencoded, wavelength-multiplexed, and time-multiplexed signal. Examples of the target-appended information that may be modulated unto the retro-reflected beam may be found in U.S. Pat. Nos. 4,631,911; 4,662,003; 4,777, 660; 4,866,781; 4,941,205; 5,317,442; 5,355,241; 5,375,008; 5,539,565; 5,793,034; and 5,966,227; each of which is incorporated herein by reference in its entirety, To facilitate this, the modulator 1204 may include an input 1210 for receiving a control signal from the controller 1208. The modulator 1204 is operable to modulate the retro-reflected beam in accordance with one or more directives underlying the control signal. To facilitate carrying out these directives, the modulator 1204 may include at least one structure adapted to respond to the control signal. This structure may be formed as a single integrated or multi-sectional structure from liquid crystal, including ferro-electric liquid crystals; a semiconductor structure having one or more quantum wells; a micro-electro-mechanical structure (MEMS); etc. using thin film or other deposition, bonding and/or coating processes.

The form of the structure may be selected based on a given end-use application and/or a trade-off between or a balancing of performance characteristics and manufacturing costs. For example, liquid crystal may be deployed to minimize manufacturing costs when performance characteristics, such as polarization sensitivity, slow speed and environmental instability, are acceptable for the given end-use application. Liquid crystal, despite exhibiting intrinsically slow speeds, may be used for carrying out an exchange of voice content in a bandwidth range of about 20 Hz to 20 kHz.

Alternatively, the structure may be formed from a sectionalized liquid crystal. In this form, the structure includes a first section for transmitting and a second section for modulating different polarization states of the retro-reflected beam. These first and second sections are operable to substantially reduce, if not eliminate, the polarization sensitivity. Other forms of liquid crystal, including polymer-dispersed liquid ("PDL") crystals, may likewise be used for reducing and/or eliminating polarization sensitivity. The PDL crystals are operable to reduce, if not eliminate, the polarization sensitivity by switchably adjusting an adjustable index change of a refractive index of the polymer-dispersed liquid crystals to cause scattering of the retro-reflected beam at one or more of its polymer/crystal interfaces Recent and on-going developments associated with liquid crystal, such as developments in polymer technologies and methods for sealing and encapsulation, have provided substantial improvement to the environmental stability of liquid crystal. Given a cost advantage of liquid crystal over other materials, the liquid crystal is likely to be a viable choice for forming the structure of the modulator 1204.

Alternatively, the semiconductor structure may be deployed to balance manufacturing costs against performance characteristics when fast response times and broad communication bandwidth are desired for the given end-use application. The MEMS may be appropriate in many of the same applications. A MEMS switch may be attractive in applications that use a wide range of wavelengths of retro-reflected electromagnetic energy, and such wide range is too large, too expensive, too difficult, etc. to be supported by liquid crystal and/or semiconductor structures. Like the structure formed from the semiconductor, the cost and complexity of manufacturing of the MEMS is greater than that of liquid crystal.

The controller 1208, which typically includes a driver, is operable to control, trigger or otherwise cause the modulator 1204 to modulate the retro-reflected beam with the target-appended information. To facilitate controlling the modulator, the controller 1208 includes an output 1212 operable to issue the control signal to the modulator 1204 via control path 1214.

To generate the control signal, the controller 1208 may also include an input 1216 for receiving from the detector 1206 the transmitter-appended information, which is demodulated from the received-light beam. The controller 1208 may use this transmitter-appended information along with the directives for generating the control signal, which may include programmable and/or hard-coded, executable instructions, commands, directions, code and/or control data, to generate the control signal to issue the modulator 1204.

In addition, the controller 1208 is operable to cause the modulator 1204 to synchronize the retro-reflected beam with the received-light beam. To facilitate this, the input 1214 may be adapted to receive from the detector 1206 a clocking or other timing signal (collectively "timing signal") to cause the controller 1208 to issue the control signal in proper synchronism.

The detector 1206 includes a electromagnetic energy sensor 1218 for detecting a presence of a search beam and/or a presence of the emitted-light beam that are emanated from the high-power transmitter 112 (FIG. 2); a demodulator 1220 for demodulating the transmitter-appended information and for recovering the timing signal from the emitted-light beam.

The electromagnetic energy sensor 1218 may be formed from a PIN diode and/or one or more InGaAs-based detectors; both of which are suitable for detecting electromagnetic energy, such as electromagnetic energy around 1550 nm, and converting the electromagnetic energy so detected into one or more electrical signals. The electromagnetic energy sensor 1218 may (i) be located near or disposed on (e.g., a center of) the substrate 1224 of the retro-directive target 1204, (ii) delineate a broad area for increasing collection efficiency of the emitted-light beam, and (iii) have its bandwidth optimized for highest sensitivity (e.g., matched to channel bandwidth).

The demodulator 1220 includes circuitry for receiving or otherwise obtaining the electrical signals from the electromagnetic energy sensor 1218. This circuitry assembles the electrical signal into the transmitter-appended information and the timing signal for transmission to the controller 1208. To facilitate transmitting the transmitter-appended information and the timing signal to the controller, the detector 1206 also includes an output 1222. The output 1222 is operable to transmit the transmitter-appended information and the timing signal at request of the controller 1208 or at some predefined interval.

Although the detector 1206 is shown with only one electromagnetic energy sensor, namely, electromagnetic energy sensor 1218, the detector 1206 may include a plurality of such electromagnetic energy sensors disposed around the retro-directive target 1202. This way, the detector 1206 is operable to detect a presence of a search beam and/or a presence of the emitted-light beam over some, and typically all, of the active area 124 of the retro-directive target 1202. In addition, the detector 1206 may be adapted to have a bandwidth that is optimized for (e.g., closely matches) at least one channel bandwidth of the emitted-light beam.

In addition, the apparatus 1200 may include one or more retro-directive targets, detectors, and controllers in addition to the retro-directive target 1204, the detector 1206, and the controller 1208. And although shown separately, the demodulator 1220 and the controller 1206 may be formed onto a single electronic board, substrate or integrated circuit. Alternatively, the demodulator 1220 and the controller 1206 may be monolithically formed into a single chip.

Moreover, the modulator 1204, like each of the corner mirrors of retro-directive target 1202, has an acceptance angle ("modulator acceptance angle"). This modulator acceptance angle may be less than 180°. To maximize reflectivity and limit reduction in the combined acceptance angle, the modulator 1204 may be formed over the retro-directive target 1202 to conform or align the modulator acceptance angle with the individual acceptance angle of each of the corner mirrors of the retro-directive target 1202.

FIGS. 13A, 13B and 13C are block diagrams illustrating examples of cross-sections of modulator enhanced retro-directive-targets 1302, 1342 and 1382. The modulator enhanced retro-directive-targets 1302, 1342 and 1382 include modulators 1304, 1344 and 1384 disposed on retro-directive targets 1306, 1346 and 1386, respectively.

The retro-directive target 1306 (FIG. 13A) includes an array 1308 of corner mirrors, such as corner mirrors 126, disposed on a corrugated substrate 1310. The corrugated substrate 1310 includes a plurality of receptacles $1312_i$-$1312_n$; each of which is operable to receive one or more of the corner mirrors 126. The receptacles $1312_i$-$1312_n$ may be formed by stamping, molding, etc., with or without simultaneous reception of the corner mirrors 126. The corner mirrors 126 of array 1308 may be arranged in four different orientations, namely, first, second, third and fourth corrugated orientations $1314_i$, $1314_j$, $1314_k$ and $1314_l$, which in turn, provide a combined acceptance angle of about 130°.

The modulator 1304 may be formed over the array 1308 and the corrugated substrate 1310 such that it conforms to the four different orientations of array 1308. To maximize reflectivity and limit reduction in the combined acceptance angle of the array 1308, the modulator 1304 includes four different sections $1316_i$, $1316_j$, $1316_k$ and $1316_l$; each of which has a modulator acceptance angle aligns with the individual acceptance angle of the first, second, third and fourth corrugated orientations $1314_i$, $1314_j$, $1314_k$ and $1314_l$. The four different sections $1316_i$, $1316_j$, $1316_k$ and $1316_l$ may be formed as a single integrated or multi-sectional structure.

Referring now to FIG. 13B, the retro-directive target 1346 includes an array 1348 of corner mirrors, such as corner mirrors 126, disposed on a corrugated substrate 1350. This corrugated substrate 1350 is transparent to and provides a medium through which the received-light beam and the emitted-light beam pass to and from the array 1348, respectively. The corrugated substrate 1350 includes an unpatterned surface 1358 and a patterned surface 1360. The unpatterned surface 1358 may be substantially flat.

The patterned surface 1360 includes a plurality of receptacles $1352_i$-$1352_n$; each of which is operable to receive one or more of the corner mirrors 126. The receptacles $1352_i$-$1352_n$ may be formed by stamping, molding, etc., with or without simultaneous reception of the corner mirrors 126. The corner mirrors 126 of array 1348 may be arranged in four different orientations, namely, first, second, third and fourth corrugated orientations $1354_i$, $1354_j$, $1354_k$ and $1354_l$, which in turn, provide a combined acceptance angle of about 100°.

The modulator 1304 may be formed over the corrugated substrate 1350 and the array 1348 such that it conforms to the unpatterned surface 1358 of the corrugated substrate 1350. Alternatively, the unpatterned surface 1358 may be a patterned surface formed to conform to the first, second, third and fourth corrugated orientations $1354_i$, $1354_j$, $1354_k$ and $1354_l$. In this case, the modulator 1304 may include four different sections (not shown); each of which has a modulator acceptance angle that aligns with the individual acceptance angle of the first, second, third and fourth corrugated orientations $1354_i$, $1354_j$, $1354_k$ and $1354_l$.

Referring now to FIG. 13C, the retro-directive target 1386 includes an array 1388 of corner mirrors, such as corner mirrors 126, disposed on a thin, flexible substrate 1390. This substrate 1390 is transparent to and provides a medium through which the received-light beam and the emitted-light beam pass to and from the array 1388, respectively. The substrate 1390 includes a first surface 1358 through which the received-light beam and the emitted-light beam pass, and a second surface 1360 to which the array 1388 is disposed.

The substrate 1390, and in turn, the corner mirrors 126 of array 1388 may be arranged in four different orientations, namely, first, second, third and fourth orientations $1394_i$, $1394_j$, $1394_k$ and $1394_l$. This arrangement provides a combined acceptance angle of about 130°.

The modulator 1304 may be formed over the array 1308 and the substrate 1390 such that it conforms to the four different orientations of array 1388. To maximize reflectivity and limit reduction in the combined acceptance angle of the array 1358, the modulator 1304 includes four different sections $1396_i$, $1396_j$, $1396_k$ and $1396_l$; each of which has a modulator acceptance angle aligns with the individual acceptance angle of the first, second, third and fourth corrugated orientations $1394_i$, $1394_j$, $1394_k$ and $1394_l$. The four different sections $1396_i$, $1396_j$, $1396_k$ and $1396_l$ may be formed as a single integrated or multi-sectional structure.

In addition, one or more high-index transparent films (not shown) may be deposited or otherwise formed (conformal or otherwise) over some or all of a light-receiving surface of any of modulators 1304, 1344 and 1384 to improve performance of the enhanced retro-directive-targets 1302, 1342 and 1382, respectively. As an alternative, one or more of the high-index transparent films may be deposited or otherwise formed between the substrates 1310, 1350 and 1390 and light-receiving surface of the modulators 1304, 1344 and 1384, respectively. These high-index transparent films may be formed so as to conform to the films to some or all of the light receiving surfaces.

Figure 14:
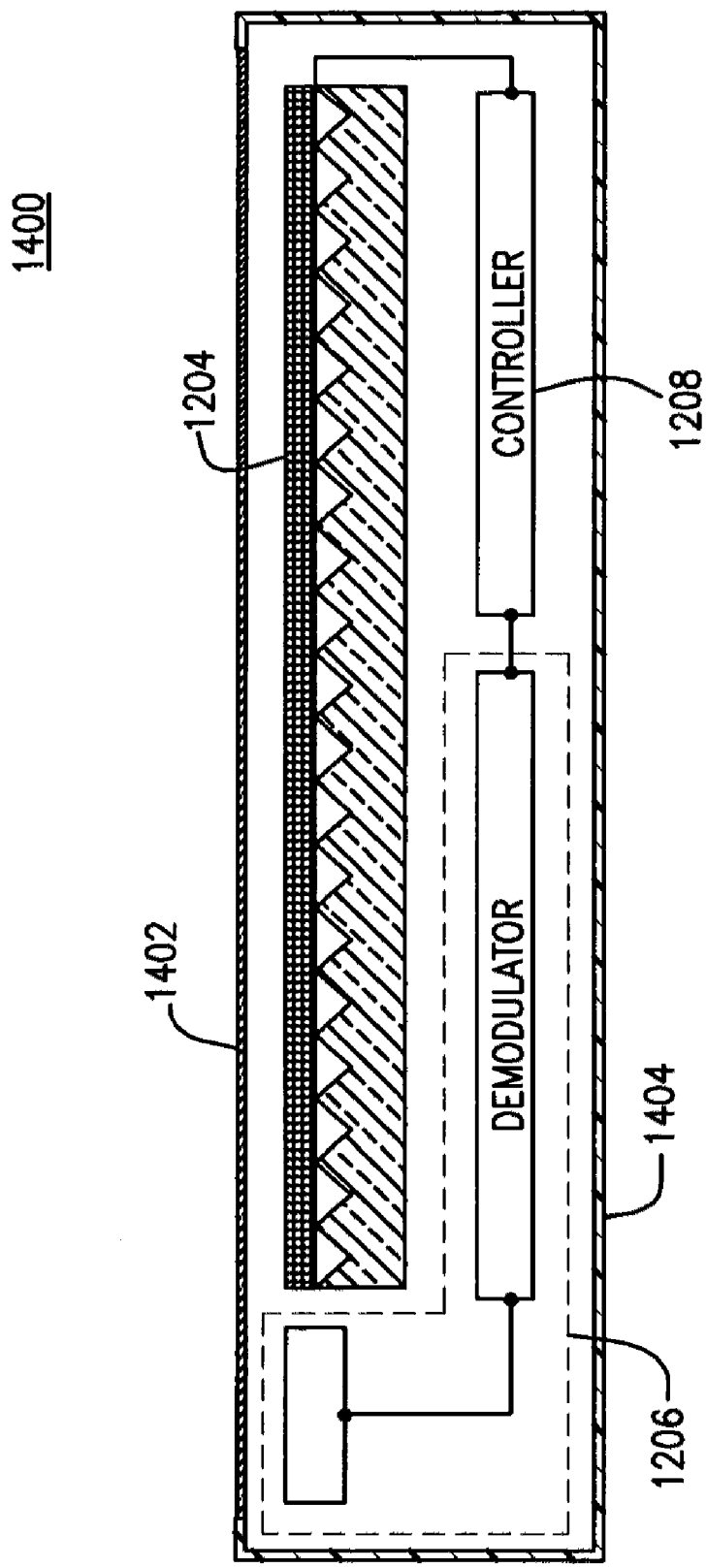
FIG. 14 is a block diagram illustrating another example of an apparatus for retro-reflecting electromagnetic energy for a bidirectional retro-directional communication.

FIG. 14 is a block diagram illustrating an example of an apparatus 1400 for retro-reflecting electromagnetic energy for a bidirectional retro-directional communication. The apparatus 1400 is similar to the apparatus of FIG. 12, except as described herein. For convenience, the apparatus 1400 is described herein with respect to the architecture shown in FIG. 12.

In addition, the apparatus 1400 may include other components for improving or optimizing performance of the apparatus 1200. These other components include, for example, an optical filter 1402; a ruggedized container 1404 for sealing the apparatus 1200 and protect it from detrimental environmental conditions; and a battery (not shown) for powering the apparatus 1400.

The optical filter 1402 may be an optical band pass filter operable to allow transmission of the received-light beam and/or the retro-reflected beam at a given range of wavelengths, such as wavelengths around 1550 nm, and rejects all other electromagnetic energy at other wavelengths. Alternatively, the optical filter 1402 may be adapted to isolate the detector 1206 from excessive illumination by ambient light and to obscure the retro-directive target 1202 and/or the apparatus 1200 (as a whole) from being viewed by a rouge receiver (not shown). As another alternative, the optical filter 1402 may be an optical wavelength demultiplexing filter for separating communication channels when multiple signals of the received-light beam are wavelength-multiplexed.

Figure 15:
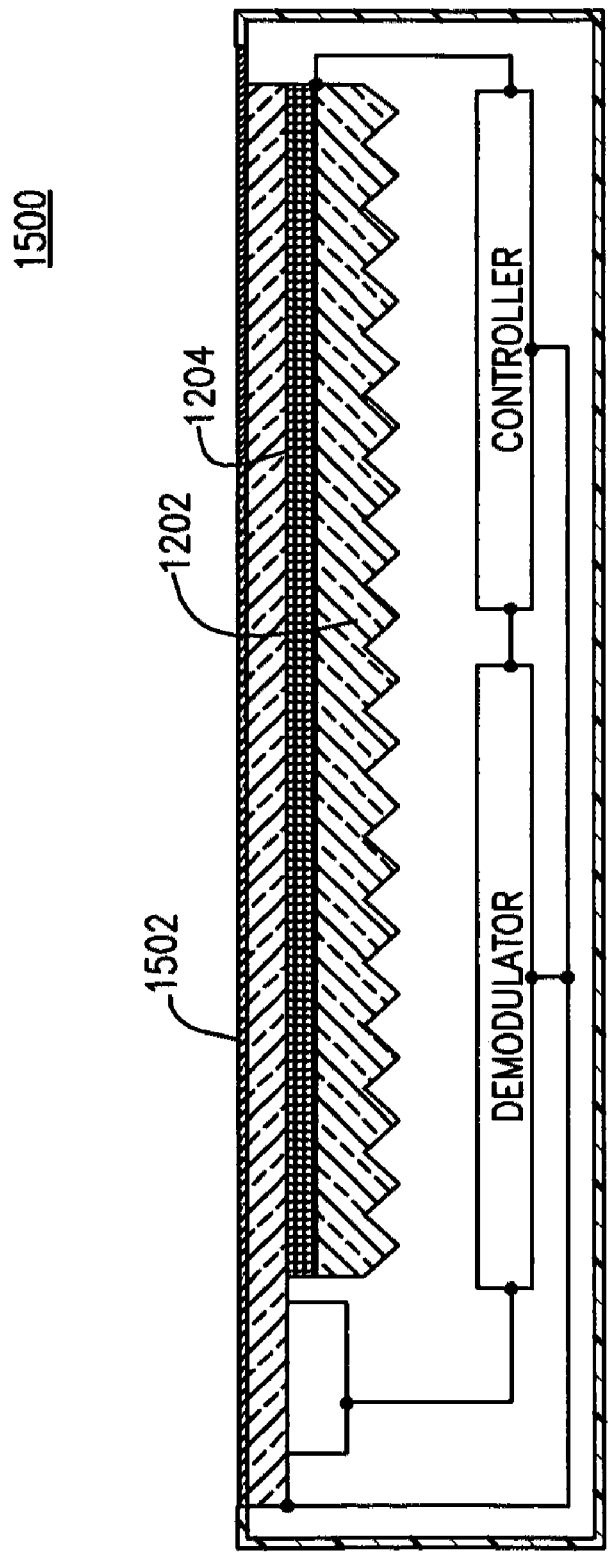
FIG. 15 is a block diagram illustrating another example of an apparatus for retro-reflecting electromagnetic energy for a bidirectional retro-directional communication.

Referring now to FIG. 15, a block diagram illustrating another example of an apparatus 1500 for retro-reflecting electromagnetic energy for a bidirectional retro-directional communication is shown. The apparatus 1500 is similar to the apparatus 1400 of FIG. 14, except as described herein. For convenience, the apparatus 1500 is described herein with respect to the architecture shown in FIGS. 12 and 14.

The apparatus 1500 may includes components for improving or optimizing performance of the apparatus 1400. Among these components is a solar cell panel 1502. The solar panel 1502 is operable to recharge the battery to extend a useful lifetime of the apparatus 1500. Alternatively, the solar panel 1502 may be used to provide a source of electrical power independent of the battery (not shown).

In addition, the solar panel 1502 may be configured to filter out the visible part of optical spectrum received by apparatus 1502. As such, the solar panel 1502 may be used in lieu of an optical filter, such as the optical filter 1402 (FIG. 14).

CONCLUSION

Variations of the apparatus and method described above are possible without departing from the scope of the invention. For instance, in the examples described above, controllers and other devices containing processors are noted. These devices may contain at least one Central Processing Unit ("CPU") and a memory. In accordance with the practices of persons skilled in the art of computer programming, reference to acts and symbolic representations of operations or instructions may be performed by the various CPUs and memories.

Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the described methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It should be understood that the examples are not limited to the above-mentioned memories and that other platforms and memories may support the described methods.

In view of the wide variety of embodiments that can be applied, it should be understood that the illustrated examples are exemplary only, and should not be taken as limiting the scope of the following claims. Further, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. An apparatus for retro-reflecting electromagnetic energy, the apparatus comprising:
   a substrate;
   a plurality of corner mirrors disposed on said substrate and having respective angles of acceptance with respect to said substrate to be operable to retro-reflect said electromagnetic energy within said respective angles of acceptance, wherein said plurality of corner mirrors are arranged to provide a combined angle of acceptance that is greater than any one of said respective angles of acceptance; and
   at least one modulator for modulating any of said electromagnetic energy received and retro-reflected, wherein said at least one modulator is disposed over at least a portion of said plurality of corner mirrors;
   wherein said substrate comprises at least one corrugated surface, and wherein said plurality of corner mirrors are disposed on said at least one corrugated surface; and
   wherein said at least one corrugated surface defines a plurality of receptacles for receiving said plurality of corner mirrors, and wherein said plurality of corner mirrors are disposed in said plurality of receptacles, and wherein said at least one modulator is disposed over said at least a portion of said plurality of corner mirrors such that said at least one modulator is conformal with said at least one corrugated surface.

2. The apparatus of claim 1, wherein said at least one modulator comprises at least one structure formed (i) in a semiconductor material and having at least one quantum well, (ii) using thin film possessing, (iii) from micro-electro-mechanical processes, (iv) from liquid crystals, or (v) from ferroelectric liquid crystals.

3. The apparatus of claim 1, wherein said at least one modulator is operable to modulate any of or any combination of (i) an intensity of said electromagnetic energy that is retro-reflected, (ii) a phase of said electromagnetic energy that is retro-reflected, and (iii) a polarization of said electromagnetic energy that is retro-reflected.

4. The apparatus of claim 2, wherein said liquid crystals are arranged to be substantially independent from intrinsic polarization with respect to said electromagnetic energy that is retro-reflected.

5. The apparatus of claim 1, wherein each of said plurality of receptacles is adapted to receive at least one of said plurality of corner mirrors.

6. The apparatus of claim 1, wherein said at least a portion of said plurality of corner mirrors have respective angular orientations with respect to said substrate, and wherein said at least one modulator has respective angular orientations corresponding to the respective angular orientations of said at least a portion of said plurality of corner mirrors.

7. The apparatus of claim 1, wherein said combined angle of acceptance provides an increase of said respective angles of acceptance in at least two planes.

8. An apparatus for retro-reflecting electromagnetic energy to carry out a communication, the apparatus comprising:
   a substrate;
   a plurality of corner mirrors disposed on said substrate and having respective angles of acceptance with respect to said substrate to be operable to retro-reflect said electromagnetic energy within said respective angles of acceptance, wherein said plurality of corner mirrors are arranged to provide a combined angle of acceptance that is greater than any one of said respective angles of acceptance;
   at least one modulator for modulating any of said electromagnetic energy received and retro-reflected, wherein said at least one modulator is disposed over at least a portion of said plurality of corner mirrors; and
   a controller for controlling said at least one modulator;
   wherein said substrate comprises at least one corrugated surface, and wherein said plurality of corner mirrors are disposed on said at least one corrugated surface; and
   wherein said at least one corrugated surface defines a plurality of receptacles for receiving said plurality of corner mirrors, and wherein said plurality of corner mirrors are disposed in said plurality of receptacles, and wherein said at least one modulator is disposed over said at least a portion of said plurality of corner mirrors such that said at least one modulator is conformal with said at least one corrugated surface.

9. The apparatus of claim 8, further comprising a demodulator for demodulating from said electromagnetic energy at least one signal.

10. The apparatus of claim 9, wherein said controller is operable to cause said at least one modulator to modulate said electromagnetic energy in accordance with any of said at least one signal and a permutation of said at least one signal.

11. The apparatus of claim 9, further comprising a detector for detecting said electromagnetic energy received from a source of said electromagnetic energy.

12. The apparatus of claim 11, further comprising an optical filter for filtering any of said electromagnetic energy received and retro-reflected.

13. The apparatus of claim 8, further comprising a container for housing said substrate, said plurality of corner mirrors and said at least one modulator, wherein said container is capable of any of withstanding a predetermined amount of shock and providing a seal against environmental conditions.

14. The apparatus of claim 8, wherein said combined angle of acceptance provides an increase of said respective angles of acceptance in at least two planes.

15. A method of making an apparatus for retro-reflecting electromagnetic energy, the method comprising:
    disposing on a substrate a plurality of corner mirrors having respective angles of acceptance with respect to said substrate to be operable to retro-reflect said electromagnetic energy within said respective angles of acceptance, wherein said plurality of corner mirrors are arranged to provide a combined angle of acceptance that is greater than any one of said respective angles of acceptance, wherein said plurality of corner mirrors are disposed in a given region of said substrate, wherein a datum associated with said region defines an axis for assessing said combined angle of acceptance, wherein said combined angle of acceptance comprises a given angle from said datum that causes the combined angle of acceptance to be greater than any one of said respective angles of acceptance, and wherein said combined angle of acceptance provides an increase of said respective angles of acceptance in at least two planes;
    wherein said substrate comprises at least one corrugated surface;
    disposing, over at least a portion of said plurality of corner mirrors, at least one modulator for modulating any of said electromagnetic energy received and retro-reflected, wherein the at least one modulator is disposed to be conformal with said at least one corrugated surface; and
    wherein said at least one corrugated surface defines a plurality of receptacles for receiving said plurality of corner mirrors, and wherein said plurality of corner mirrors are disposed in said plurality of receptacles.

16. The method of claim 15, wherein said datum is vertical to said region.

17. The method of claim 15, wherein said substrate comprises a ductile material, and wherein disposing in a substrate a plurality of corner mirrors comprises stamping said plurality of corner mirrors in said substrate.

18. The method of claim 15, wherein said substrate comprises a pliable material, and wherein disposing in a substrate a plurality of corner mirrors comprises molding said plurality of corner mirrors in said substrate.

19. The method of claim 15, wherein said at least one modulator comprises a structure formed using thin film possessing.

20. A method of making an apparatus for dynamic optical tagging, the method comprising:
    disposing on a substrate a plurality of corner mirrors having respective angles of acceptance with respect to said substrate to be operable to retro-reflect said electromagnetic energy within said respective angles of acceptance, wherein said plurality of corner mirrors are arranged to provide a combined angle of acceptance that is greater than any one of said respective angles of acceptance; and
    disposing, over at least a portion of said plurality of corner mirrors, at least one modulator for modulating any of said electromagnetic energy received and retro-reflected;
    wherein said substrate comprises at least one corrugated surface; and
    wherein said at least one corrugated surface defines a plurality of receptacles for receiving said plurality of corner mirrors, and wherein said plurality of corner mirrors are disposed in said plurality of receptacles, and wherein said at least one modulator is disposed over said at least a portion of said plurality of corner mirrors such that said at least one modulator is conformal with said at least one corrugated surface.

21. The method of claim 20, wherein said at least one modulator comprises a structure formed using thin film possessing.

22. The method of claim 20, further comprising: disposing, over at least a portion of said at least one modulator, a high-index transparent film.

23. The method of claim 20, further comprising: disposing, between at least a portion of said at least one modulator and said substrate, a high-index transparent film.

24. The method of claim 20, further comprising: affixing said substrate, said plurality of corner mirrors and said at least one modulator in a protective housing.

25. The method of claim 24, further comprising affixing any of an optical filter and a solar panel to said protective housing through which said electromagnetic energy passes to said at least one modulator.

26. The method of claim 20, further comprising providing at least one controller to control said at least one modulator.

27. The method of claim 20, wherein said combined angle of acceptance provides an increase of said respective angles of acceptance in at least two planes.

* * * * *